US012570892B2

(12) United States Patent
Hull et al.

(10) Patent No.: US 12,570,892 B2
(45) **Date of Patent: *Mar. 10, 2026**

(54) FILTER CAKE REMOVAL REACTIVE TREATMENT FLUID WITH CHELATING AGENT AND VISCOELASTIC SURFACTANT AND METHODS OF USING SAME

(71) Applicant: Saudi Arabian Oil Company, Dhahran (SA)

(72) Inventors: Katherine Leigh Hull, Houston, TX (US); Rajesh Kumar Saini, Houston, TX (US); Nam Mai, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,965

(22) Filed: Jun. 6, 2024

(65) Prior Publication Data

US 2025/0376615 A1 Dec. 11, 2025

(51) Int. Cl.
*C09K 8/528* (2006.01)
*E21B 37/06* (2006.01)

(52) U.S. Cl.
CPC .............. *C09K 8/528* (2013.01); *E21B 37/06* (2013.01); *C09K 2208/30* (2013.01); *E21B 2200/08* (2020.05)

(58) Field of Classification Search
None
See application file for complete search history.

(56) References Cited

U.S. PATENT DOCUMENTS

| | | | |
|---|---|---|---|
| 7,219,731 B2 | 5/2007 | Sullivan et al. | |
| 7,500,517 B2 | 3/2009 | Looney et al. | |
| 7,588,085 B2 | 9/2009 | Acock et al. | |
| 7,789,164 B2 | 9/2010 | Looney et al. | |
| 7,857,055 B2 | 12/2010 | Li | |
| 9,688,904 B2 | 6/2017 | Wang et al. | |
| 11,124,695 B2 | 9/2021 | Mahmoud et al. | |
| 11,352,548 B2 | 6/2022 | Hull et al. | |
| 11,597,867 B2 | 3/2023 | Hull et al. | |
| 2003/0216263 A1 | 11/2003 | Tibbles et al. | |
| 2007/0087940 A1 | 4/2007 | Qu et al. | |
| 2008/0039347 A1* | 2/2008 | Welton ..................... | C09K 8/08 507/213 |
| 2009/0139723 A1* | 6/2009 | Pirolli ..................... | C09K 8/52 507/203 |
| 2010/0216672 A1 | 8/2010 | Todd | |

(Continued)

FOREIGN PATENT DOCUMENTS

| | | |
|---|---|---|
| WO | WO 0040667 | 7/2000 |
| WO | WO 2018187565 | 10/2018 |

OTHER PUBLICATIONS

U.S. Appl. No. 18/732,298, Hull et al., filed Jun. 3, 2024.

(Continued)

*Primary Examiner* — Andrew Sue-Ako

(74) *Attorney, Agent, or Firm* — Fish & Richardson P.C.

(57) ABSTRACT

A fluid comprising: a base fluid; a chelating agent; a carbonate; an oxidizing salt; an organic acid; a viscoelastic surfactant (VES); and a base, where a viscosity of the fluid is 300 cP (mPa·s) or less at a temperature of 300° F. (148.9° C.) or less, and where a density of the fluid from 9 lb/gal (1.08 kg/L) to 20 lb/gal (2.40 kg/L).

19 Claims, 10 Drawing Sheets

$\lessgtr$ 900

Inject a Reactive Treatment Fluid into a Wellbore in a Subterranean Formation Including a Filter Cake Including Barite on a Wall of the Wellbore, where the Reactive Treatment Fluid Includes a Base Fluid, a Chelating Agent, a Carbonate, an Oxidizing Salt, an Organic Acid, a Viscoelastic Surfactant (VES), and a Base — 902

Contact the Reactive Treatment Fluid with the Filter Cake in the Wellbore to Dissolve or Exfoliate the Barite from the Wall into the Reactive Treatment Fluid — 904

Recover the Reactive Treatment Fluid Including the Barite Removed from the Wall — 906

(56) References Cited

U.S. PATENT DOCUMENTS

| | | | |
|---|---|---|---|
| 2012/0247774 A1 | 10/2012 | Li et al. | |
| 2013/0137610 A1 | 5/2013 | Huang et al. | |
| 2014/0116710 A1 | 5/2014 | Naser-El-Din et al. | |
| 2017/0066959 A1 | 3/2017 | Hull et al. | |
| 2021/0024809 A1* | 1/2021 | Ba Geri | C09K 8/032 |
| 2021/0198553 A1* | 7/2021 | Hull | C09K 8/536 |

OTHER PUBLICATIONS

U.S. Appl. No. 18/734,267, Saini et al., filed Jun. 5, 2024.

Abdelgawad et al., "Stimulation of high temperature carbonate gas reservoirs using seawater and chelating agents: Reaction kinetics," Journal of Natural Gas Science and Engineering, Jul. 2018, 55:595-605, 11 pages.

Almubarak et al., "From initial treatment design to final disposal of chelating agents: a review of corrosion and degradation mechanisms," RSC Adv., Jan. 12, 2022, 12:1813-1833, 21 pages.

amcmud.com [online], "AMC Salt Tables," Available on or before Aug. 2019, retrieved on Aug. 2, 2024, retrieved from URL <https://amcmud.com/wp-content/uploads/sites/2/2019/10/AMC-Salt-Tables-Aug. 2019.pdf>, 17 pages.

Ba geri et al., "Different techniques for characterizing the filter cake," Presented at the SPE Unconventional Gas Conference and Exhibition, Muscat, Oman, Jan. 2013, 13 pages.

Ba geri et al., "Effect of Sand Content on the Filter Cake Properties and Removal During Drilling Maximum Reservoir Contact Wells in Sandstone Reservoir," J. Energy Resour. Technol., May 2016, 138(3):032901-1-032901-10, 10 pages.

Bezemer et al., "Filtration Behavior of Circulating Drilling Fluids," Society of Petroleum Engineers Journal, Dec. 1966, pp. 292-298, 7 pages.

Civan, "A Multi-Phase Mud Filtrate Invasion and Wellbore Filter Cake Formation Model," Presented at the International Petroleum Conference and Exhibition of Mexico, Veracruz, Mexico, Oct. 1994, pp. 399-412, 14 pages.

CRO242ES, "CRONOX™ 242 ES Corrosion Inhibitor," Safety Data Sheet Brochure, Dec. 17, 2019, 12 pages.

Davidson et al., "New and Effective Filter Cake Removal Optimizes Water Injectivity," Presented at the SPE International Symposium and Exhibition on Formation Damage Control, Lafayette, Louisiana, USA, Feb. 2012, 11 pages.

Davison et al., "Oil-Based Muds for Reservoir Drilling: Their Performance and Cleanup Characteristics," SPE Drilling & Completion, Jun. 2001, 16(2):127-134, 8 pages.

drillingfluid.org [online], "Completion and Workover Fluids," Aug. 30, 2018, retrieved on Aug. 2, 2024, retrieved from URL <https://drillingfluid.org/drilling-fluids-handbook/completion-and-workover-fluids.html>, 4 pages.

Frick et al., "Horizontal Well Damage Characterization and Removal," SPE Prod & Frac, Feb. 1, 1993, 8(1):15-22, 8 pages.

Gordon et al., "Rheological Properties of Cement Spacer: Mixture Effect," Prepared for presentation at the 2008 AADE Fluids Conference and Exhibition held at the Wyndam Greenspoint Hotel, Houston, Texas, Apr. 8-9, 2008, 5 pages.

Hanssen et al., "New Enzyme Process for Downhole Cleanup of Reservoir Drilling Fluid Filtercake," Presented at the SPE International Symposium on Oilfield Chemistry, Houston, Texas, Feb. 16, 1999, 13 pages.

Hossain et al., "Chapter 3—Drilling Fluids," Fundamentals of Sustainable Drilling Engineering, 2015, pp. 73-139, 67 pages.

Huang et al., "Degradation of high molecular weight polyacrylamide by alkali-activated persulfate: Reactivity and potential application in filter cake removal before cementing," Journal of Petroleum Science and Engineering, Mar. 2019, 174:70-79, 10 pages.

Jaberi et al., "Minimizing the Barite Scale in Carbonate Formations during the Filter Cake Removal Process," ACS Omega, May 19, 2022, 7(21):17976-17983, 8 pages.

Jaffal et al., "Modeling of filtration and mudcake buildup: An experimental investigation," Journal of Natural Gas Science and Engineering, 2017, 38:1-11, 11 pages.

O-BASF, "Global Oilfield Solutions Corrosion Inhibitors for Production: Basocorr™," BASF—Global Oilfield Solutions brochure, Available on or before Sep. 6, 2017, 6 pages.

Rabia, "Chapter 7—Drilling Fluids," Well Engineering & Construction, 2001, pp. 197-234, 38 pages.

Rana et al., "Application of High-Density Brines in Drilling and Completion Fluids: Current Insights and Future Perspectives," Energy & Fuels, 2024, 38:6561-6578, 18 pages.

Shende, "Dissolution of Barite Scale Using Chelating Agents," A Thesis for the degree of Master of Science, Texas A&M University, May 2012, 68 pages.

Siddig et al., "A review of different approaches for water-based drilling fluid filter cake removal," Journal of Petroleum Science and Engineering, Sep. 2020, 192(107346):1-10, 10 pages.

Siddig et al., "A review of the various treatments of oil-based drilling fluids filter cakes," Journal of Petroleum Exploration and Production Technology, Published online on Dec. 22, 2021, 12:365-381, 17 pages.

Sosa et al., "Acidic Polysaccharides as Green Alternatives for Barite Scale Dissolution," ACS Applied Materials & Interfaces, Nov. 24, 2020, 12(49):55434-55443, 10 pages.

Thiele et al., "Rapid Dissolution of BaSO4 by Macropa, an 18-Membered Macrocycle with High Affinity for Ba2+," Journal of the American Chemical Society, Nov. 28, 2018, 140(49):17071-17078, 8 pages.

Zain et al., "Cleanup of Wall-Building Filter Cakes," Presented at the SPE Annual Technical Conference and Exhibition, Houston, Texas, Oct. 1999, 14 pages.

* cited by examiner

FIG. 4E $$^-O-\overset{\overset{\displaystyle O}{\|}}{C}-(CH_2)_2-\overset{\overset{\displaystyle R}{|}}{N}-(CH_2)_2-\overset{\overset{\displaystyle O}{\|}}{C}-O^-$$

FIG. 5A $$C_{17}H_{33}-\overset{\overset{\displaystyle O}{\|}}{C}-\overset{\overset{\displaystyle H}{|}}{N}-(CH_2)_3-\overset{|}{\underset{|}{N^+}}-CH_2-\overset{\overset{\displaystyle O}{\|}}{C}-O^-$$

FIG. 5B $$C_{21}H_{41}-\overset{\overset{\displaystyle O}{\|}}{C}-\overset{\overset{\displaystyle H}{|}}{N}-(CH_2)_3-\overset{|}{\underset{|}{N^+}}-CH_2-\overset{\overset{\displaystyle O}{\|}}{C}-O^-$$

FIG. 5C $$C_8H_{17}-\overset{\displaystyle}{\underset{\displaystyle H}{C}}=\overset{\displaystyle}{\underset{\displaystyle H}{C}}-C_8H_{16}-\overset{\displaystyle |}{\underset{\displaystyle}{N}}\!\!{}^{+}\!\!\overset{Cl^{-}}{\underset{\displaystyle OH}{}}$$

FIG. 6A

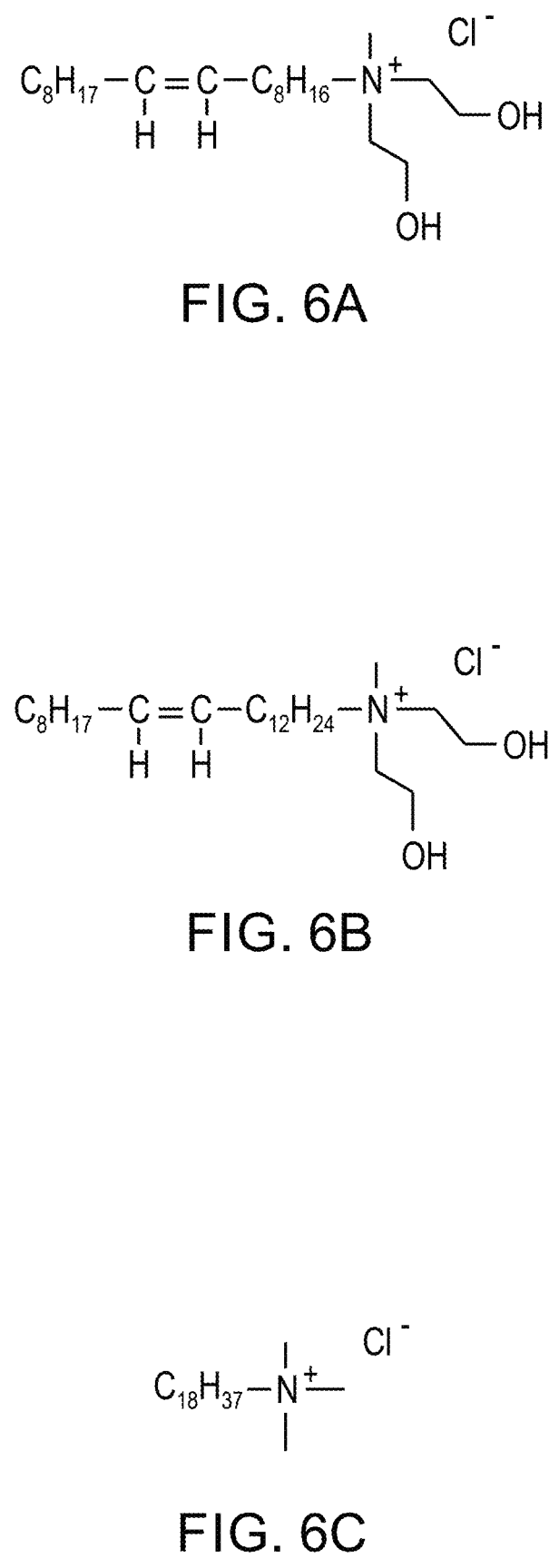

$$C_8H_{17}-\overset{\displaystyle}{\underset{\displaystyle H}{C}}=\overset{\displaystyle}{\underset{\displaystyle H}{C}}-C_{12}H_{24}-\overset{\displaystyle |}{\underset{\displaystyle}{N}}\!\!{}^{+}\!\!\overset{Cl^{-}}{\underset{\displaystyle OH}{}}$$

FIG. 6B

$$C_{18}H_{37}-\overset{\displaystyle |}{\underset{\displaystyle |}{N}}\!\!{}^{+}\!\!-\quad Cl^{-}$$

FIG. 6C

Figures 7A, 7B, 7C:
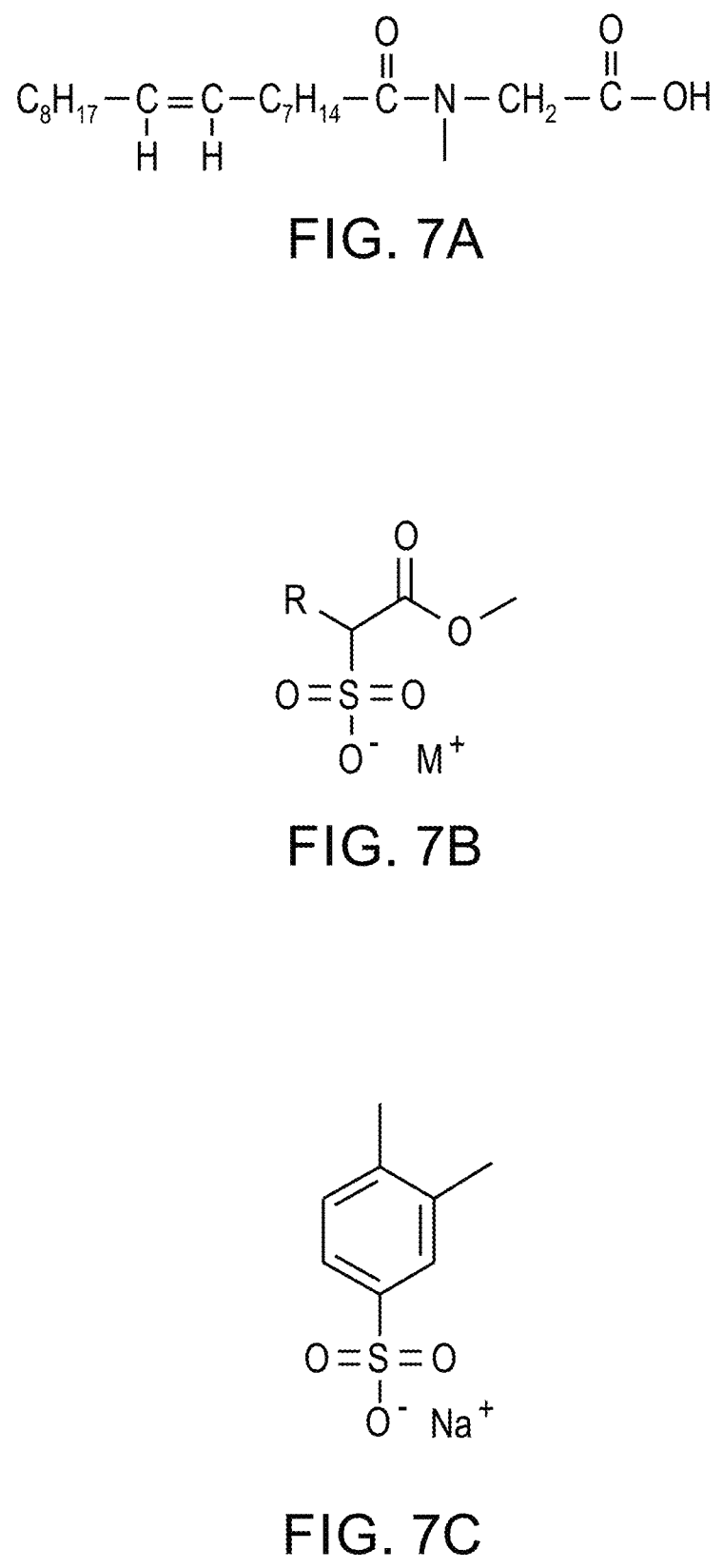

$$C_8H_{17}-\underset{\underset{H}{|}}{C}=\underset{\underset{H}{|}}{C}-C_7H_{14}-\overset{\overset{O}{\|}}{C}-\underset{\underset{|}{}}{N}-CH_2-\overset{\overset{O}{\|}}{C}-OH$$

FILTER CAKE REMOVAL REACTIVE TREATMENT FLUID WITH CHELATING AGENT AND VISCOELASTIC SURFACTANT AND METHODS OF USING SAME

TECHNICAL FIELD

This disclosure relates to filter cake removal reactive treatment fluid containing a chelating agent and viscoelastic surfactant (VES) and the methods of using same.

BACKGROUND

Drilling fluid, or drilling mud, aides the drilling of holes into a subterranean formation in the Earth's crust. During the drilling, the drilling fluid cools and lubricates the drill bit and also carries and removes rock cuttings from the hole. The drilling fluid also provides hydrostatic pressure to prevent or reduce formation fluids from the subterranean formation entering into the hole during drilling. Drilling fluids are typically mixtures of solid additives present as discontinuous phases spread in a liquid continuous phase. Depending on the type of the liquid phase, in general, drilling fluids can be water based drilling fluids ("WBDFs") or oil based drilling fluids ("OBDFs"). The drilling fluids may be designed to achieve different operational objectives including lubrication of the drill bit and drill string, transferring the drilled cuttings out of the hole while drilling, and suspending cuttings when the fluid circulation is stopped. Another objective may be to prevent the formation fluids from invading the wellbore hole. In the drilling operation with the drilling fluid, wellbore stability may be promoted by forming a low-permeability film on the borehole wall, labeled as filter cake, also called cake, mudcake, or wall cake. The filter cake may also reduce drilling fluid invasion into the drilled formation. Once the process of drilling is complete, the filter cake may be removed before production operations to prevent flow capacity issues and enhance injectivity through injection wells.

SUMMARY

This disclosure describes technologies relating to filter cake removal after the drilling process. In various implementations, the disclosure provides treatment fluid compositions for filter cake removal, which contain a VES and a chelating agent, which can effectively dissolve or exfoliate highly resistant filter cake components such as barite. In various implementations, the treatment fluid described in this disclosure is a "reactive" treatment fluid that can chemically interact with at least a portion of the filter cake to be removed such that the attacked filter cake can be removed into the phase of the reactive treatment fluid. Further, the reactive treatment fluid can be prepared to have a high fluid density sufficient to maintain wellbore stability and overburden pressure so that that the filter cake removal process will not cause kickoff or well blowoff. In some implementations, a brine comprising one or more inorganic salts is used as a base fluid to prepare the reactive treatment fluid. For example, a completion brine designed for a subsequent completion phase after the filter cake removal can be used as the base fluid. The compositions can effectively remove filter cake containing a mixture of barite and polymeric materials. In addition, the reactive treatment fluid can also be effective in horizontal sections of the wellbore, where the depletion of the reactive treatment fluid near the heel of the well may be challenging using some of the conventional treatment fluids.

In an implementation, the treatment fluid includes: a base fluid; a chelating agent; a carbonate; an oxidizing salt; an organic acid; a VES; and a base, where a viscosity of the fluid is 300 cP (mPa·s) or less at a temperature of 300° F. (148.9° C.) or less, and where a density of the fluid from 9 lb/gal (1.08 kg/L) to 20 lb/gal (2.40 kg/L).

In an aspect, combinable with any other aspect, the base fluid includes a brine.

In an aspect, a total dissolved solids (TDS) of the brine is from 50,000 ppm to 250,000 ppm.

In an aspect, combinable with any other aspect, the base fluid includes potassium chloride, sodium chloride, calcium chloride, calcium bromide, potassium formate, or cesium formate.

In an aspect, combinable with any other aspect, the density is from 10 lb/gal (1.20 kg/L) to 16 lb/gal (1.92 kg/L).

In an aspect, combinable with any other aspect, the viscosity is 300 cP (mPa·s) or less at a temperature from 200° F. (93.3° C.) to 300° F. (148.9° C.).

In an aspect, combinable with any other aspect, the viscosity is from 80 cP (mPa·s) to 100 cP (mPa·s) at a temperature from 200° F. (93.3° C.) to 300° F. (148.9° C.).

In an aspect, combinable with any other aspect, the chelating agent includes an aminopolycarboxylic acid or a salt thereof, and where the VES includes erucylamidopropyl betaine.

In an aspect, combinable with any other aspect, the carbonate is potassium carbonate or cesium carbonate, and where the oxidizing salt includes a chlorate or bromate.

In an aspect, combinable with any other aspect, the organic acid includes oxalic acid, formic acid, acetic acid, or lactic acid.

In an aspect, combinable with any other aspect, the base includes potassium hydroxide.

In an aspect, combinable with any other aspect, the fluid further includes an acid-generating material including poly-lactic acid (PLA), polyglycolic acid (PGA), an orthoester, or a polyanhydride.

In an implementation, a fluid for filter cake removal includes: a brine at a concentration from 50 weight percent (wt. %) to 70 wt. % of the fluid, the brine including calcium chloride or calcium bromide; diethylenetriamine pentaacetic acid (DTPA) at a concentration from 1 wt. % to 15 wt. % of the fluid; a carbonate at a concentration from 5 wt. % to 30 wt. % of the fluid; an oxidizing salt at a concentration from 1 wt. % to 20 wt. % of the fluid; oxalic acid at a concentration from 1 wt. % to 15 wt. % of the fluid; a viscoelastic surfactant (VES); and a base at a concentration from 0.2 wt. % to 5 wt. % of the fluid, where a viscosity of the fluid is 300 cP (mPa·s) or less at a temperature of 300° F. (148.9° C.) or less, and where a density of the fluid from 9 lb/gal (1.08 kg/L) to 20 lb/gal (2.40 kg/L).

In an aspect, combinable with any other aspect, the density is from 12 lb/gal (1.44 kg/L) to 14 lb/gal (1.68 kg/L)).

In an aspect, combinable with any other aspect, the viscosity is from 80 cP (mPa·s) to 100 cP (mPa·s) at a temperature from 200° F. (93.3° C.) to 300° F. (148.9° C.).

In an aspect, combinable with any other aspect, a pH of the fluid is from 9 to 12.

In an implementation, a method of treating a wellbore for filter cake removal includes: injecting a reactive treatment fluid into a wellbore in a subterranean formation including a filter cake on a wall of the wellbore, the filter cake including a barite, the reactive treatment fluid including: a base fluid, a chelating agent, a carbonate, an oxidizing salt, an organic acid, a VES, and a base, where the reactive treatment fluid has a density from 9 lb/gal (1.08 kg/L) to 20 lb/gal (2.40 kg/L) and a viscosity of 300 cP (mPa·s) or less at a temperature of 300° F. (148.9° C.) or less; contacting the reactive treatment fluid with the filter cake in the wellbore, the reactive treatment fluid dissolving or exfoliating the barite from the wall into the reactive treatment fluid; and recovering the reactive treatment fluid including the barite removed from the wall.

In an aspect, combinable with any other aspect, the method further includes, prior to injecting the reactive treatment fluid into the wellbore, forming the wellbore by drilling, where the drilling forms the filter cake in the wellbore.

In an aspect, combinable with any other aspect, the method further includes providing carbon dioxide ($CO_2$) into the wellbore.

In an aspect, combinable with any other aspect, the method further includes foaming the reactive treatment fluid with $CO_2$.

BRIEF DESCRIPTION OF DRAWINGS

FIGS. 4A-4E are example chemical structures of a chelating agent for a VES for a reactive treatment fluid.

FIGS. 5A-5C are example chemical structures of zwitterionic surfactants for a VES for a reactive treatment fluid.

FIGS. 6A-6C are example chemical structures of cationic surfactants for a VES for a reactive treatment fluid.

FIGS. 7A-7C are example chemical structures of anionic surfactants for a VES for a reactive treatment fluid.

DETAILED DESCRIPTION

Figure 1:
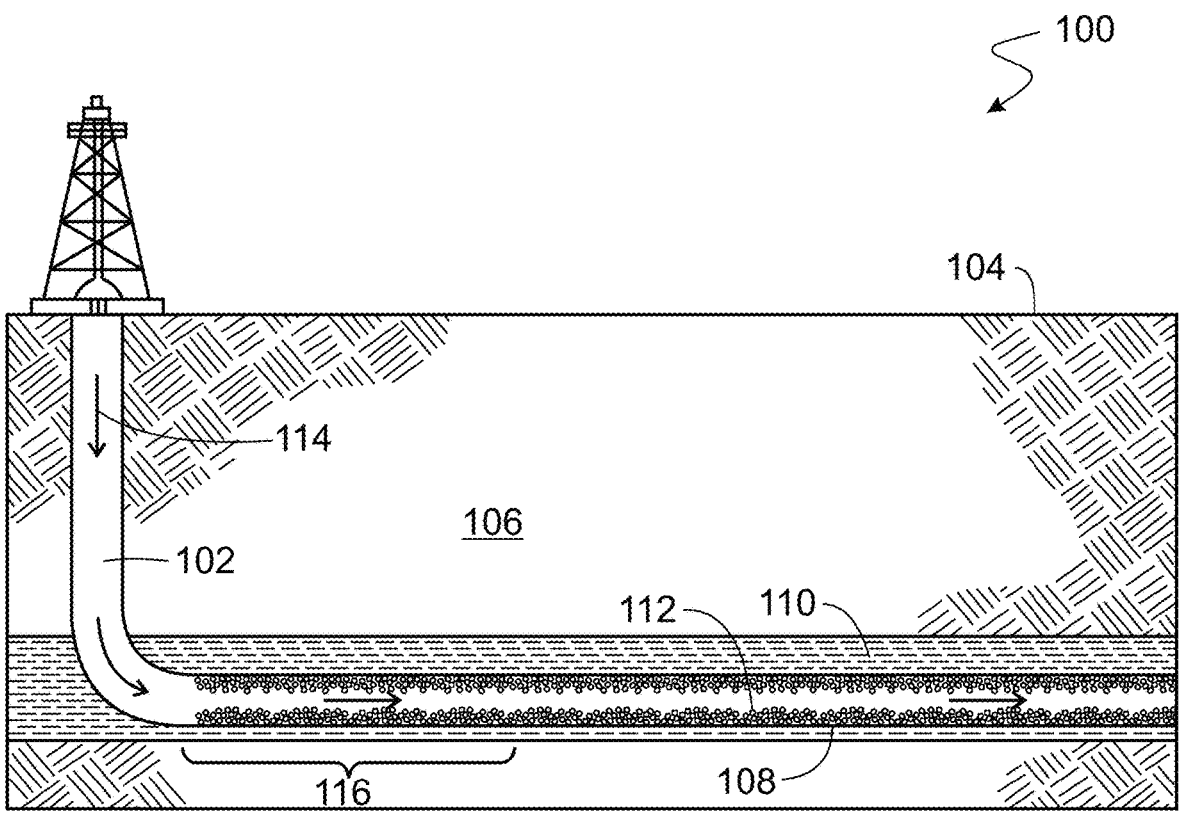
FIG. 1 is a schematic diagram of a well having a wellbore formed through the Earth surface into a subterranean formation.

Implementations described herein provide reactive treatment fluids for filter cake removal. In some implementations, the reactive treatment fluids contain a chelating agent and a VES mixed in a base fluid. Also provided are methods of using the reactive treatment fluid to remove a filter cake from a wellbore in a subterranean formation. Generally, The reactive treatment fluids of the disclosure are applicable for both water-based filter cakes and oil-based filter cakes. Generally, the reactive treatment fluids of the disclosure can effectively remove filter cake containing a mixture of barite and polymeric materials.

In certain wells such as high-pressure wells, preventing kickoff and well blowoff can be a potential challenge. In various implementations, the density of the reactive treatment fluid can be manipulated to overcome these issues. While certain conventional reactive treatment fluid can offer a range of viscosity that is desired for filter cake removal, less attention has been paid to the overall density of the reactive treatment fluid and its balance with the viscosity. In various implementations, the use of a relatively high-density reactive treatment fluid for filter cake removal in this disclosure can help maintain wellbore stability and overburden pressure to prevent the possible issues in the high-pressure wells.

The density of the reactive treatment fluid can be adjusted to be relatively higher compared to some of the conventional treatment fluids. For example, the density can be from 9 lb/gal (1.08 kg/L) to 20 lb/gal (2.40 kg/L). In various implementations, the relatively high density of the reactive treatment fluid is achieved by using a brine containing one or more inorganic salts for the base fluid. For example, the brine can contain one or more chloride, bromide, and formate species.

In various implementations, the reactive treatment fluid composition is an aqueous solution containing a chelating agent, a VES, and additives to help remove the resistant components in the filter cake, such as barite and certain carbonates, while maintaining the ability to dissolve other components. The additives can include one or more of a sulfate converter, a chelation activator, a pH control agent, and an oxidizing salt. In some implementations, the sulfate converter is potassium carbonate. In some implementations, the chelation activator is oxalic acid. In some implementations, the pH control agent is a base. In some implementations, the oxidizing salt is sodium bromate. The combined use of various components in the reactive treatment fluid can be particularly effective in dissolving and/or exfoliating different portions of the filter cake. For example, the chelating agent can be primarily responsible for dissolution of barite and calcium carbonate particles in the filter cake, while the oxidizing salt can attack polymeric materials. The VES can gel the reactive treatment fluid to provide a VES gel, which is useful in retaining the oxidizing salt and delivering it to an end portion of a horizontal portion of the wellbore. In some implementations, the injection of the reactive treatment fluid is combined or alternated with the injection of another treatment fluid, e.g., a fluid containing $CO_2$ to enhance the filter cake removal efficiency.

Figures 8A, 8B:
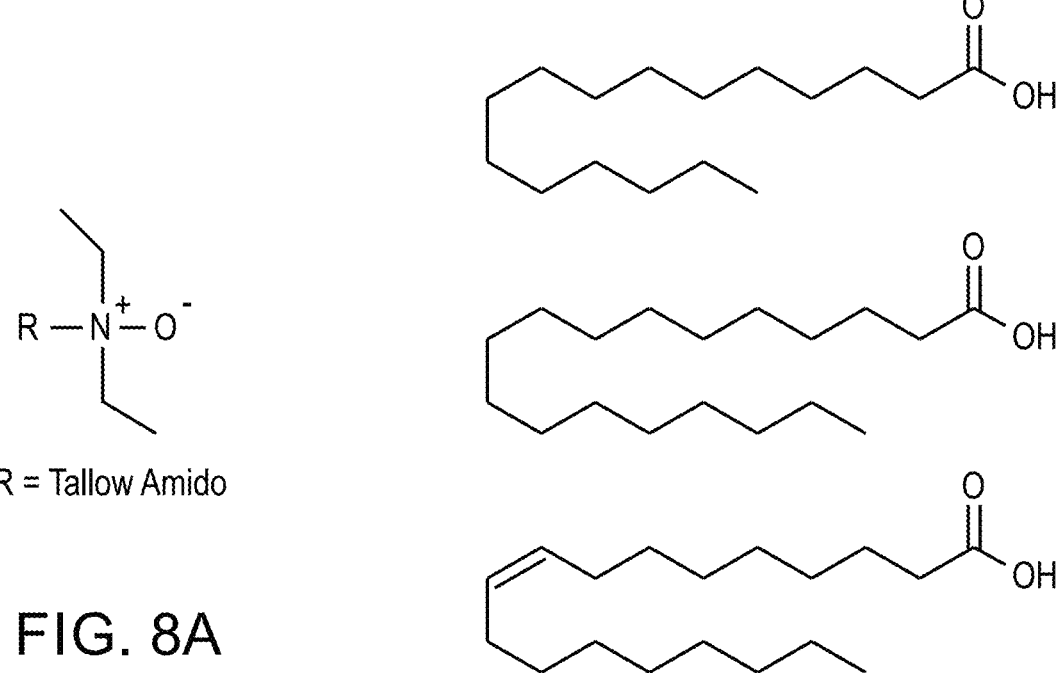
FIGS. 8A-8B are example chemical structures of nonionic surfactants for a VES for a reactive treatment fluid.
Figure 9:
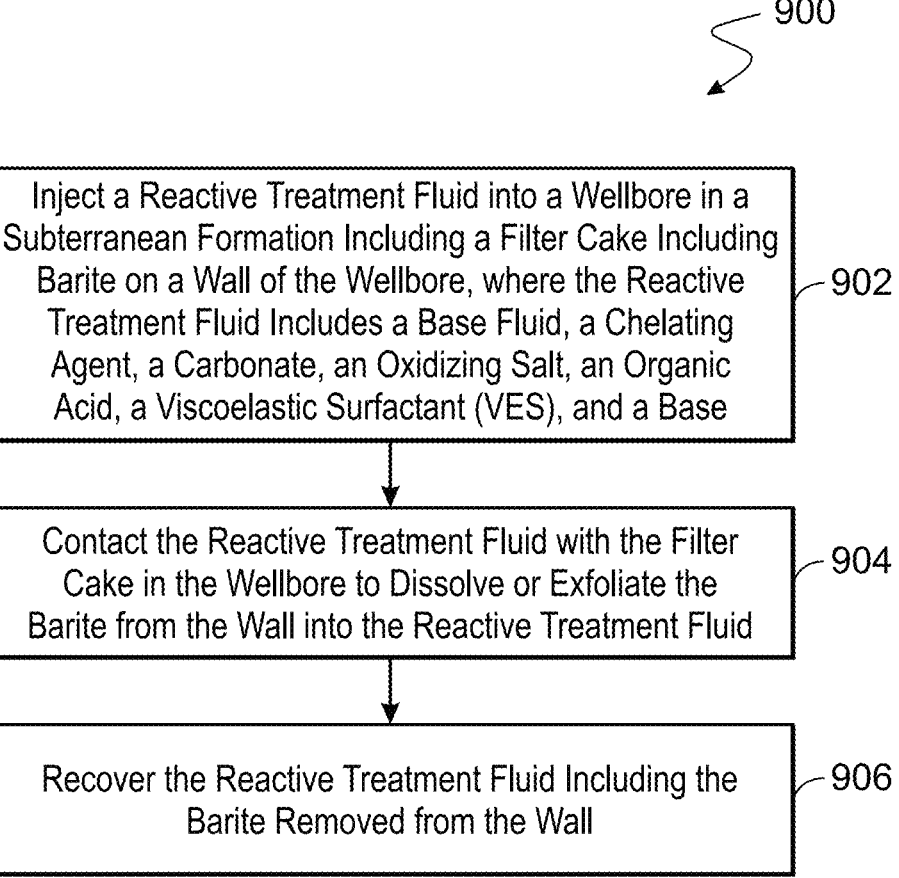
FIG. 9 is a process flow diagram of the process of filter cake removal.

In the following, the overview of the filter cake formation and removal is first provided referring to FIGS. 1, 2, and 3A-3C. The compositions of reactive treatment fluid in various implementations are then described referring to FIGS. 4A-4E, 5A-5C, 6A-6C, 7A-7C, and 8A-8B. FIG. 9 is an example process flow diagram for the filter cake removal process. Example compositions of the reactive treatment fluid are studied for their rheological properties and described referring to Table 1 and FIG. 10. Further, filter cake removal test results using these fluids are described referring to Tables 2 and 3. In this disclosure, the filter cake "removal" can include permeability enhancement of the filter cake.

Filter Cake Formation and Removal

FIG. 1 is a diagram of a well 100 having a wellbore 102 formed through the Earth surface 104 into a subterranean formation 106. The wellbore 102 has a horizontal portion 108 in a hydrocarbon reservoir section 110 of the subterranean formation 106.

The wellbore 102 can be openhole but is generally a cased wellbore. The annulus between the casing and the subterranean formation 106 can be cemented. Perforations can be formed through the casing and cement into the subterranean formation 106. The perforations may allow both for flow of fracturing fluid into the subterranean formation 106 and for flow of produced hydrocarbon from the subterranean formation 106 into the wellbore 102.

The wellbore 102 has a filter cake 112 on a wall of the wellbore 102. As further described below, the filter cake 112 can be formed because of the drilling of the well 100. A treatment fluid 114 is injected into the wellbore 102 to remove the filter cake 112. In some conventional methods, the reactive treatment fluid 114 can use acid, such as hydrochloric acid, where the acid may be spent quickly and thus may only treat and remove the filter cake 112 in a small section 116 of the wellbore 102. In various implementations of the disclosure, the reactive treatment fluid 114 is a reactive treatment fluid that can be tuned to have a desired rheology and functionality, e.g., acidity, such that the reactive treatment fluid 114 can reach the end portion of the long horizontal portion of the wellbore 102.

Figure 2:
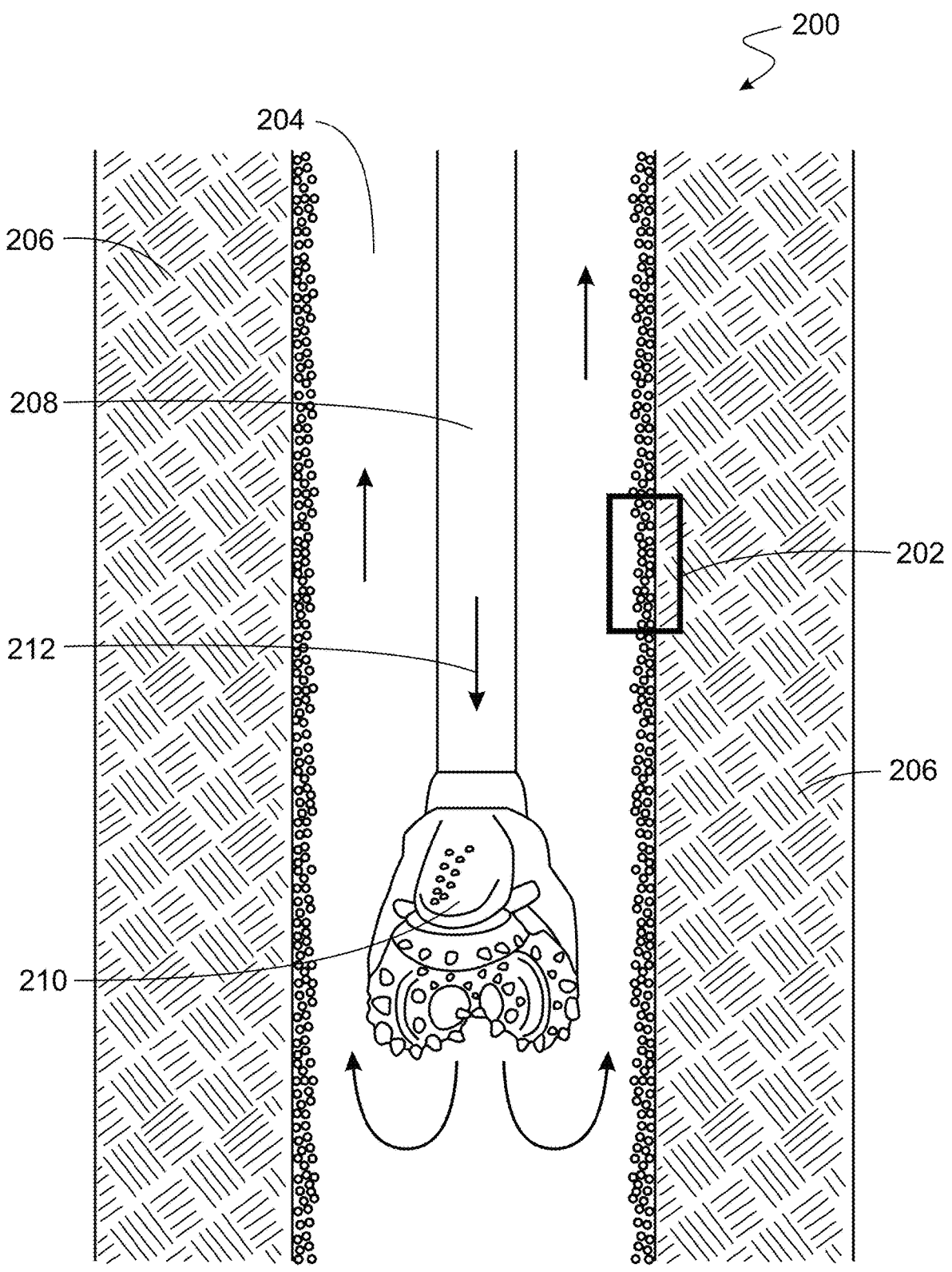
FIG. 2 is a schematic diagram of a well having a filter cake.

FIG. 2 is a diagram of a well 200 having a filter cake 202. The well 200 includes a wellbore 204 formed in a subterranean formation 206. The face of the subterranean formation 206 is formed by drilling is the wellbore 204 wall. A drill string 208 and drill bit 210 are disposed in the wellbore 204. In the drilling operation, drilling fluid 212 is injected into the drill string 208. The drilling fluid 212 can be pumped, for example, by mud pumps from the Earth surface into the drill string 208 in the wellbore 204.

The well site of the well 200 can include surface equipment, such as a mounted drilling rig, piping, and storage tanks, at the Earth surface. The surface equipment may include the aforementioned mud pumps that can be, for example, centrifugal pumps, positive displacement pumps, reciprocating pumps, or piston pumps.

The wellbore diameter can be, for example, in a range from 3.5 inches (8.9 centimeters) to 30 inches (76 centimeters), or outside of this range. The depth of the wellbore 204 can range from 300 feet (100 meters) to more than 30,000 feet (9,100 meters). The wellbore 204 can be vertical, horizontal, or deviated, or any combinations thereof.

To form a hole in the ground, the drill bit 210 with cutters can be lowered into the wellbore 204 and rotated to break the rock of the subterranean formation 206. In the rotation, the cutters may interface with the subterranean formation 206 to grind, cut, scrape, shear, crush, or fracture rock to drill the hole. The drill bit 210 can be a component of the drill string 208 or coupled to the drill string 208. The drill bit 210 can be lowered via the drill string 208 into the wellbore 204 (borehole) to drill the wellbore 204 into the subterranean formation 206 in the Earth crust. In operation, the drilling fluid 212, also known as drilling mud, is circulated down the drill string 208 and through multiple nozzles in the drill bit 210 to the bottom of the wellbore 204. The drilling fluid 212 may then flow upward towards the surface through an annulus between the drill string 208 and the wall of the wellbore 204. The drilling fluid 212 may cool the drill bit 210, apply hydrostatic pressure upon the subterranean formation 206 penetrated by the wellbore 204 to prevent or reduce fluids from flowing into the wellbore 204, reduce the torque and the drag force induced by the friction between the drill string 208 and the wellbore 204 wall, carry the formation cuttings up to the surface, and so forth.

The filter cake 202 can be formed via the circulating drilling fluid 212. Solids from the drilling fluid 212 can build on the surface of the subterranean formation 206, which is the wall of the wellbore 204, as the filter cake 202. In some implementations, the filter cake 202 form as solids of the drilling fluid 212 slurry deposit on permeable portions of the subterranean formation 206 face under wellbore 204 pressure. Initially, as the filter cake 202 is being deposited on the surface of the permeable material, the material firstly serves as a filter and allows the liquid portions, e.g., filtrate, of the drilling fluid 212 to pass through while trapping the insoluble solid portion as a cake. Over time, enough filter cake gathers on the surface of the permeable material, thereby allowing little or no further liquid invasion. The drilling fluid 212 can be configured for formation of the filter cake 202. This filter cake 202 may be deposited on the porous rocks under overbalance pressure conditions. The formation of filter cake 202 can advantageously prevent or reduce further loss of drilling fluid 212 into the subterranean formation 206 and reduce solid invasion as well. In other words, the filter cake 202 can help prevent loss circulation and formation damage that would be caused by fines and filtrate invasion into reservoir rocks. A filter cake 202 that is relative thin and with low permeability may generally be desirable. For example, the filter cake 202 can have a thickness from about 0.5 mm to about 3 mm, e.g., from 1 mm to 2 mm. The permeability of the filter cake 202 can be from 0.001 millidarcy (md) $(0.987 \times 10^{-18} \text{ m}^2)$ to 0.1 md $(0.987 \times 10^{-16} \text{ m}^2)$, e.g., from 0.001 millidarcy (md) $(0.987 \times 10^{-18} \text{ m}^2)$ to 0.01 md $(0.987 \times 10^{-17} \text{ m}^2)$ or from 0.01 millidarcy (md) $(0.987 \times 10^{-17} \text{ m}^2)$ to 0.1 md $(0.987 \times 10^{-16} \text{ m}^2)$.

In various implementations, the drilling fluid 212 used to form the wellbore 204 is a WBDF or an OBDF. Accordingly, the filter cake 202 can have a composition determined by the type of the drilling fluid used and its process conditions.

A WBDF can use fresh water, salt water, or seawater as a continuous phase. A WBDF can contain one or more of viscosifiers, fluid loss control agents, weighting agents, lubricants, emulsifiers, corrosion inhibitors, salt and pH control agents with different type of additives based on well conditions and reservoir properties. Examples of the weighting agents include calcium carbonate, barite, ilmenite, hematite and manganese tetroxide. In some implementations, the weighting agent accounts for approximately 80 weight percent (wt. %) of the WBDF, e.g., from 70 wt. % to 90 wt. %, or from 65 wt. % to 85 wt. %. For rheological control, different types of polymers can be used, for example, xanthan gum, lignosulfonates and partially hydrolyzed poly(acrylamide) (PHPA). For fluid loss control, a mixture of starch and polyanionic cellulose (PAC), carboxymethyl cellulose, carboxymethyl starch, hydroxypropyl starch can be used. A WBDF can further contain sodium and potassium silicate as inhibitor additives at high pH to prevent shale swelling.

On the other hand, an OBDF can contain diesel oil or palm oil as a base fluid. Further, an OBDF can contain a water-resistant polymer such as ethylene-propylene polymer, maleated polymer, organophilic clay, and poly-a-olefins. In some implementations, the water-resistant polymer is used as a rheology modifier, e.g., viscosifier. The drilling fluid 212 can also contain a weighting agent and other additives, e.g., emulsifier, wetting agent, biocide, deformer, and lubricant. The weighting agent can include various inorganic salts such as calcium carbonate, bentonite, barite, hematite, ilmenite, and manganese tetroxide.

Figures 3A, 3B, 3C:
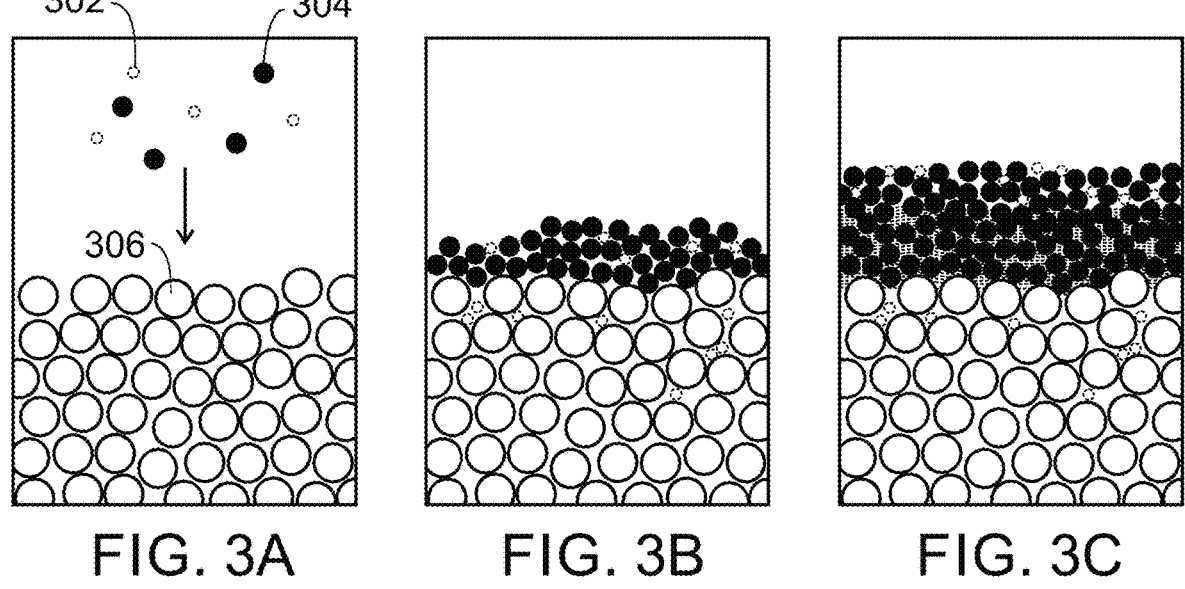
FIGS. 3A-3C are schematic diagrams of a sequence of particle buildup of filter cake on the surface of the subterranean formation in a wellbore.

FIGS. 3A-3C are diagrams of a sequence of particle buildup of filter cake on the surface of the subterranean formation in a wellbore. As illustrated in FIGS. 3A-3C, particles 302, 304 signify solid components of the drilling fluid formulation. The circles 306 signify the granular porous nature of the subterranean rock formation, where some of the filter cake can invade into the formation. In FIG. 3A, the particles 302, 304 in the drilling fluid are depicted flowing toward the formation, as indicated by an arrow. In FIG. 3B, in the time sequence later in time, the particles 302,

304 accumulate on the formation face, which includes the wellbore wall, forming the filter cake. In some implementations, as illustrated in FIG. 3B, some of the smaller particles 302 may invade into the formation. FIG. 3C illustrates the time sequence is later in which the filter cake may be considered formed. The filter cake may be characterized as the collection of particles 302, 304 at the formation face. The build of the particles 302, 304 including the dense accumulation of the smaller particles 302 may desirably provide for low permeability of the filter cake.

After the drilling process, a filter cake removal process can be performed prior to further well operations. However, the complexity of the filter cake compositions may pose challenges in its removal. Since the filter cake is formed during the drilling process, the filter cake can include various materials such as polymers and inorganic salts derived from the drilling fluid. In some implementations, the primary component of the filter cake is from the weighting agent of the drilling fluid used, e.g., barite and calcium carbonate.

In some implementations, the reactive treatment fluid is specifically tailored to attack an OBFC. Such an OBFC can contain oils, e.g., diesel oil or palm oil, a water-resistant polymer such as ethylene-propylene polymer, maleated polymer, organophilic clay, and poly-a-olefins. Further, the oil-based filter cake can include various inorganic salts such as calcium carbonate, bentonite, barite, ilmenite, and manganese tetroxide.

In general, an effective filter cake treatment fluid exhibits multifunctionality, where it can degrade and attack both polymeric materials, e.g., gelling polymer and fluid loss agent, and inorganic salts such as barite and carbonate species. The polymeric materials in the filter cake include polysaccharides such as xanthan, carboxymethyl cellulose, polyacrylamide, partially hydrolyzed acrylamide, carboxymethyl hydroxypropyl guar gum (CMHPG), hydroxypropyl guar gum (HPG), starch, and chitosan.

Base Fluid for Reactive Treatment Fluid

The reactive treatment fluid can be an aqueous solution having a density sufficiently high to be applicable in high pressure wells. For example, the high pressure well where the reactive treatment fluid can be applied has a pressure from 1000 psi (6.9 MPa) to 6000 psi (41.4 MPa), e.g., from 2000 psi (13.8 MPa) to 6000 psi (41.4 MPa), from 3000 psi (20.7 MPa) to 6000 psi (41.4 MPa), from 4000 psi (27.6 MPa) to 6000 psi (41.4 MPa), from 5000 psi (34.5 MPa) to 6000 psi (41.4 MPa), from 1000 psi (6.9 MPa) to 5000 psi (34.5 MPa), from 1000 psi (6.9 MPa) to 4000 psi (27.6 MPa), from 1000 psi (6.9 MPa) to 3000 psi (20.7 MPa), or from 1000 psi (6.9 MPa) to 2000 psi (13.8 MPa). In one implementation, the pressure can be from 1000 psi (6.9 MPa) to 10000 psi (68.9 MPa). The reactive treatment fluid can be used in any type of hydrocarbon-bearing rock formation including carbonate, e.g., calcite or dolomite, sandstone, or unconventional source rocks such as shale. The use of a relatively high-density reactive treatment fluid for filter cake removal can help maintain wellbore stability and overburden pressure to prevent kickoff or well blowoff. In various implementations, the density of the reactive treatment fluid is at least 9 lb/gal (1.08 kg/L) (e.g., at least 9.7 lb/gal (1.16 kg/L), at least 10 lb/gal (1.20 kg/L), or at least 12 lb/gal (1.44 kg/L)), and/or at most 20 lb/gal (2.40 kg/L) (e.g., at most 19.7 lb/gal (2.36 kg/L), at most 18 lb/gal (2.16 kg/L), at most 16 lb/gal (1.92 kg/L), or at most 14 lb/gal (1.68 kg/L)). In some implementations, the density is from 9 lb/gal (1.08 kg/L) to 20 lb/gal (2.40 kg/L) (e.g., from 9.7 lb/gal (1.16 kg/L) to 19.7 lb/gal (2.36 kg/L), from 10 lb/gal (1.20 kg/L) to 16 lb/gal (1.92 kg/L), or from 12 lb/gal (1.44 kg/L) to 14 lb/gal (1.68 kg/L)).

In various implementations, the base fluid to prepare the reactive treatment fluid derives from fresh water, brine water, pond water, tap water, flowback water, or sea water. In this disclosure, the base fluid can mean any fluid that accounts for a major portion of the reactive treatment fluid, e.g., at least 50 weight percent (wt. %) of the resulting reactive treatment fluid.

The base fluid can contain various salts to provide the desired density for the reactive treatment fluid. In various implementations, the base fluid is at least 50 wt. % of the reactive treatment fluid (e.g., at least 55 wt. % or at least 60 wt. %), and/or at most 70 wt. % (e.g., at most 65 wt. % or at most 60 wt. %). In some implementations, the base fluid is from 50 wt. % to 70 wt. % of the reactive treatment fluid (e.g., from 55 wt. % to 70 wt. %, from 60 wt. % to 70 wt. %, from 65 wt. % to 70 wt. %, from 50 wt. % to 65 wt. %, from 50 wt. % to 60 wt. %, or from 50 wt. % to 55 wt. %).

In various implementations, the base fluid can contain monovalent or divalent salts. In some implementations, the base fluid can contain the salts at a concentration from 1 wt. % to 50 wt. % of the base fluid (e.g., from 10 wt. % to 50 wt. %, from 20 wt. % to 50 wt. %, from 30 wt. % to 50 wt. %, from 40 wt. % to 50 wt. %, from 1 wt. % to 40 wt. %, from 1 wt. % to 30 wt. %, from 1 wt. % to 20 wt. %, from 1 wt. % to 10 wt. %, or from 1 wt. % to 5 wt. %). These salts can help increasing the density of the base fluid and thereby the reactive treatment fluid prepared with the base fluid. In some implementations, the salts can also promote micelle formation, such as wormlike or cylindrical micelles, to increase viscosity of the fluid.

Examples of these salts include lithium fluoride (LiF), sodium fluoride (NaF), potassium fluoride (KF), magnesium fluoride ($MgF_2$), calcium fluoride ($CaF_2$), strontium fluoride ($SrF_2$), barium fluoride ($BaF_2$), lithium chloride (LiCl), sodium chloride (NaCl), potassium chloride (KCl), magnesium chloride ($MgCl_2$), calcium chloride ($CaCl_2$)), strontium chloride ($SrCl_2$), barium chloride ($BaCl_2$), zinc chloride ($ZnCl_2$), lithium bromide (LiBr), sodium bromide (NaBr), potassium bromide (KBr), magnesium bromide ($MgBr_2$), calcium bromide ($CaBr_2$), strontium bromide ($SrBr_2$), barium bromide ($BaBr_2$), and zinc bromide ($ZnBr_2$).

In some implementations, the base fluid includes a completion brine that can be used for a completion phase after the filter cake removal. In some implementations, the base fluid includes KCl, NaCl, $CaCl_2$), a mixture of $CaCl_2$) and $CaBr_2$, potassium formate, or cesium formate. For example, the base fluid can be derived from a single-salt brine, two-salt brine, or any brine containing three or more types of salt applicable as a completion fluid. In some implementations, the single-salt brine has a density up to 11.6 pounds per gallon (ppg) (1.39 kg/L), for example, using $CaCl_2$). The single-salt brine can contain KCl, NaCl, NaBr, or $CaCl_2$), for example. In some implementations, the two-salt brine contains $CaCl_2$) and $CaBr_2$ and has a density from 14.1 ppg (1.69 kg/L) to 14.3 ppg (1.71 kg/L).

In some embodiments, the filter cake treatment fluid is prepared in weighted brine. The weighted brine can be any one of the following or combination of thereof to meet the density requirements of the well. The brines comprise KCl brine, NaCl brine, $CaCl_2$) brine, $CaCl_2$)/$CaBr_2$ brine, potassium formate brine, cesium formate brine. These brines are capable of providing density from 9.7 lb/gal to 19.7 lb/gal.

In some implementations, the brine is prepared by dissolving solid salts in fresh water. For example, to prepare a 10 barrel (bbl) (1590 L) of 13 lb/gal (1.56 kg/L) $CaBr_2$ brine solution, 95% purity solid ($CaBr_2$ 2675 lb (1213 kg)) can be mixed with fresh water (7.9 bbl (1256 L)).

The total content of the dissolved inorganic salts in the brine used for preparing the reactive treatment fluid can be represented as total dissolved solids (TDS). In some implementations, the TDS of the brine is at least 500,000 parts per million (ppm) (e.g., at least 750,000 ppm, at least 1,000,000 ppm, or at least 1,250,000 ppm). In some implementations, the TDS is from 500,000 ppm to 1,000,000 ppm, e.g., from 500,000 ppm to 900,000 ppm, from 500,000 ppm to 800,000 ppm, from 500,000 ppm to 700,000 ppm, or from 500,000 ppm to 600,000 ppm.

As used herein, "total dissolved solids" or "TDS" refers to the sum of the combined amount of all inorganic salts contained in the injection water in the form of charged ions, such as monovalent ions and divalent ions. TDS can also be considered a measure of the salinity of a solution of interest.

Chelating Agent for Reactive Treatment Fluid

Figures 4A, 4B, 4C, 4D, 4E:
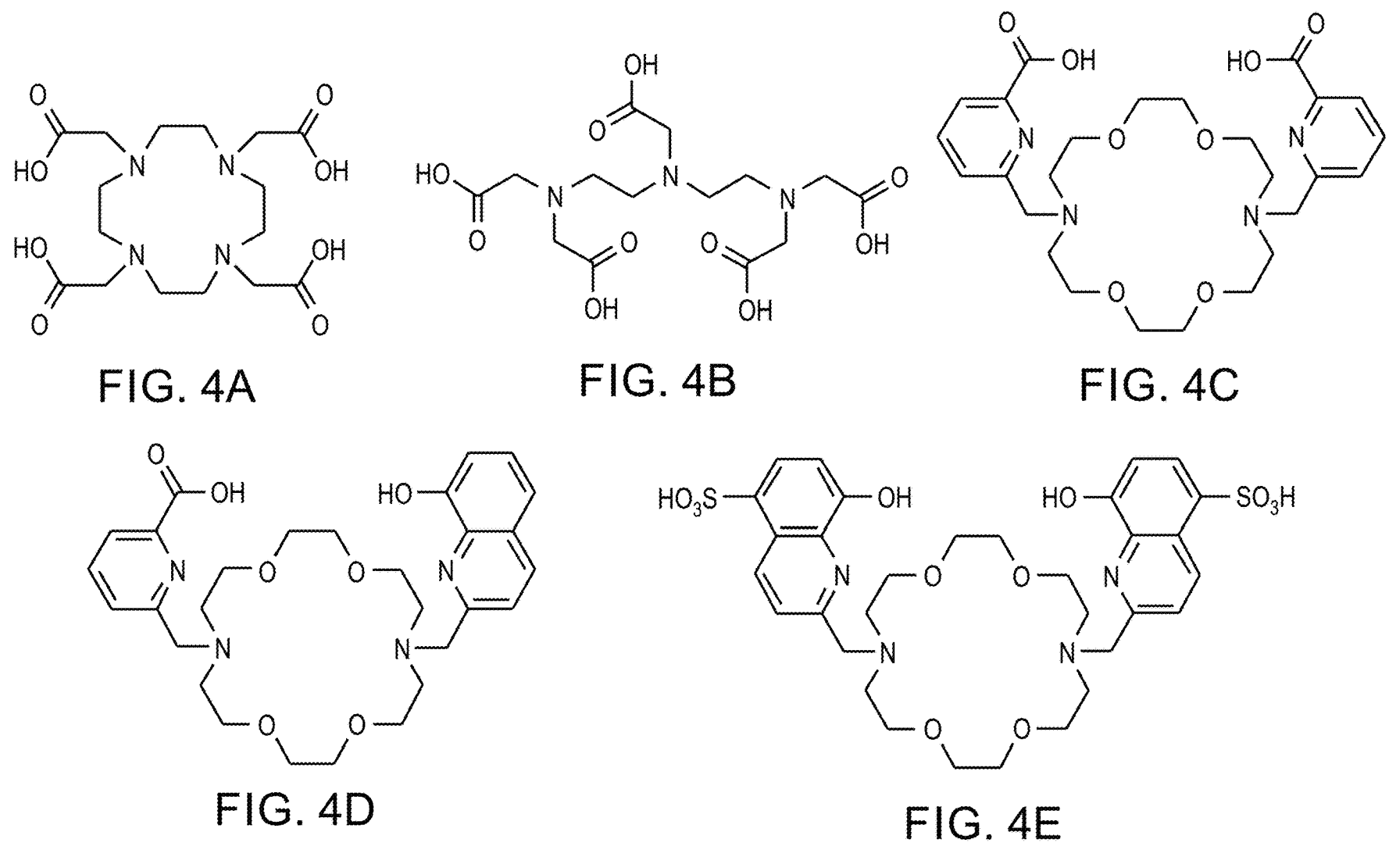

The reactive treatment fluid can be an aqueous solution containing a chelating agent. In various implementations, the chelating agent in the reactive treatment fluid is capable of dissolving, fragmenting, or exfoliating the resistant inorganic salt species such as barite and calcium carbonate particles into the solution phase. These species can then be removed from the wall of the wellbore and the well system. The chelating agent can be less corrosive and more environmentally friendly in comparison to mineral acids. In some implementations, the chelating agent includes an aminopolycarboxylic acid. It can be used in its salt form, e.g., sodium, potassium, or cesium salt. Examples of the chelating agent include, but are not limited to, diethylenetriamine pentaacetic acid (DTPA), hydroxyethyl ethylenediaminetriacetic acid (HEDTA), ethylenediaminetetraacetic acid (EDTA), nitrilotriacetic acid (NTA), ethyleneglycol-O,O'-bis(2-aminoethyl)-N,N,N',N'-tetraacetic acid (EGTA), hydroxyethyl iminodiacetic acid (HIDA), glutamic acid N,N-diacetic acid (GLDA), tetraaza macrocycle (DOTA), macropa, and macropaquin. Chemical structures of some chelating agents are illustrated in FIGS. 4A-4E: DOTA (FIG. 4A), DTPA (FIG. 4B), macropa (FIG. 4C), macropaquin (FIG. 4D), and macroquin-$SO_3$ (FIG. 4E).

In various implementations, the chelating agent is at least 1 wt. % (e.g., at least 3 wt. % or at least 5 wt. %) and/or at most 15 wt. % (e.g., at most 13 wt. % or at most 10 wt. %) of the reactive treatment fluid. In some implementations, the chelating agent is from 1 wt. % to 15 wt. % of the reactive treatment fluid (e.g., from 5 wt. % to 15 wt. %, from 10 wt. % to 15 wt. %, from 1 wt. % to 10 wt. %, or from 1 wt. % to 5 wt. %). In some implementations, more than one type of chelating agent is used.

Sulfate Converter for Reactive Treatment Fluid

The reactive treatment fluid can further include a sulfate converter that can interact with sulfate species in the filter cake such as barite and convert it to carbonate species. For example, barite ($BaSO_4$) can be converted to barium carbonate ($BaCO_3$), which has a higher solubility than the sulfate counterpart. The converted carbonate species can then be dissolved in the reactive treatment fluid, e.g., catalyzed by acid or through chelation.

In various implementations, the sulfate converter includes a carbonate such as potassium carbonate ($K_2CO_3$), sodium carbonate ($Na_2CO_3$), and cesium carbonate ($Cs_2CO_3$). In some implementations, the sulfate converter can effectively convert the sulfate species at a high pH, e.g., from 12 to 14. In some implementations, the amount of the sulfate converter included in the reactive treatment fluid is determined according to the amount of barite in the filter cake. In one implementation, a stoichiometric amount of the sulfate converter is used to react with the barite.

In various implementations, the sulfate converter is at least 5 wt. % (e.g., at least 10 wt. % or at least 20 wt. %) and/or at most 30 wt. % (e.g., at most 20 wt. % or at most 10 wt. %) of the reactive treatment fluid. In some implementations, the sulfate converter is from 5 wt. % to 30 wt. % of the reactive treatment fluid (e.g., from 10 wt. % to 30 wt. %, from 15 wt. % to 30 wt. %, from 20 wt. % to 30 wt. %, from 25 wt. % to 30 wt. %, from 5 wt. % to 25 wt. %, from 5 wt. % to 20 wt. %, from 5 wt. % to 15 wt. %, or from 5 wt. % to 10 wt. %). In some implementations, more than one type of sulfate converter is used.

Chelation Activator for Reactive Treatment Fluid

The reactive treatment fluid can further include a chelation activator that can facilitate the chelation of the resistant filter cake components by the chelating agent. In various implementations, the chelation activator includes an organic acid such as oxalic acid, formic acid, acetic acid, and lactic acid. In some implementations, the organic acid can be directly added to the reactive treatment fluid.

In various implementations, the chelation activator is at least 1 wt. % (e.g., at least 3 wt. % or at least 5 wt. %) and/or at most 15 wt. % (e.g., at most 13 wt. % or at most 10 wt. %) of the reactive treatment fluid. In some implementations, the chelation activator is from 1 wt. % to 15 wt. % of the reactive treatment fluid (e.g., from 3 wt. % to 15 wt. %, from 5 wt. % to 15 wt. %, from 8 wt. % to 15 wt. %, from 10 wt. % to 15 wt. %, from 13 wt. % to 15 wt. %, from 1 wt. % to 13 wt. %, from 1 wt. % to 10 wt. %, from 1 wt. % to 8 wt. %, from 1 wt. % to 5 wt. %, or from 1 wt. % to 3 wt. %). In some implementations, more than one type of chelation activator is used.

Viscoelastic Surfactant (VES) for Reactive Treatment Fluid

The reactive treatment fluid can be an aqueous solution containing one or more VES. The VES can induce gelation of the reactive treatment fluid to provide a VES gel. In various implementations, the VES concentration in the base fluid, e.g., brine, is at least 1 volume percent (vol. %) (e.g., at least 3 vol. % or at least 5 vol. %) and/or at most 15 vol. % (e.g., at most 13 vol % or at most 10 vol. %). In some implementations, the VES concentration in the base fluid is from 1 vol. % to 15 vol. % depending on the temperature and viscosity requirement. For example, the VES concentration can be from 6 vol. % to 10 vol. %, from 8 vol. % to 10 vol. %, from 4 vol. % to 8 vol. %, or from 4 vol. % to 6 vol. %. In other implementations, the VES concentration is from 0.1 wt. % to 10 wt. %, e.g., from 1 wt. % to 10 wt. %, from 5 wt. % to 10 wt. %, from 0.1 wt. % to 5 wt. %, or from 0.1 wt. % to 1 wt. %.

In various implementations, since the density of the VES can be lower than other components for the reactive treatment fluid, the VES concentration on weight basis can be slightly lower than the corresponding concentration on volume basis. For example, the VES concentration of 8 ppb (0.96 kg/L) and the other components being added (e.g., $CaBr_2$, $NaBrO_3$, and/or $NH_4Cl$ brines) have higher density greater than 9.5 ppb (1.14 kg/L). In an implementation, in a fluid with an overall density 13 ppb (1.56 kg/L), 6 vol. % VES is approximately 3.7 wt. %. In a fluid with an overall density of 12 ppb (1.44 kg/L), 5 vol. % VES is approximately 3.3 wt. %.

The VES can include a zwitterionic or amphoteric surfactant, a cationic surfactant, an anionic surfactant, a nonionic surfactant, or a combination of cationic and anionic surfactants. The base fluid for the reactive treatment fluid can be fresh water, seawater, produced water, treated water, or a combination thereof.

Figures 5A, 5B, 5C:
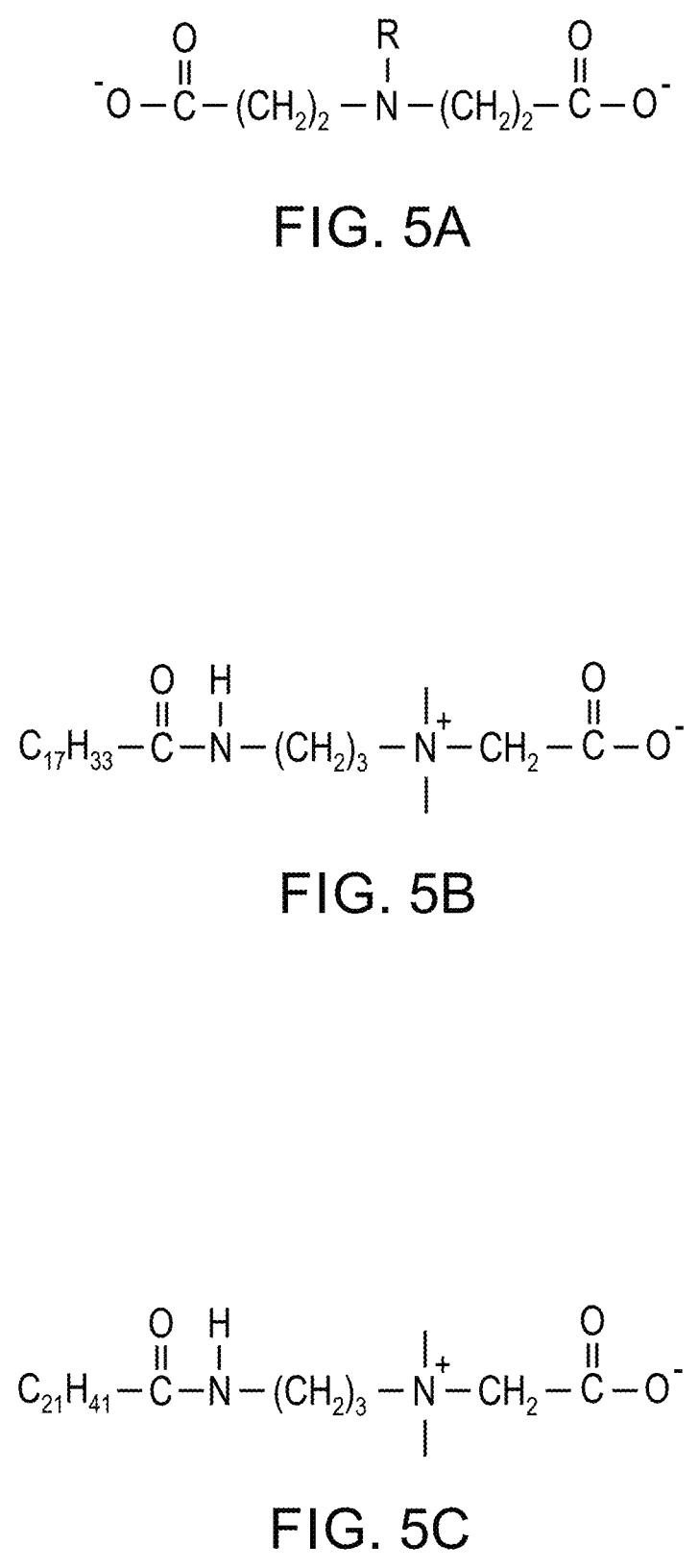

The zwitterionic surfactant can be a betaine, phospho-betaine, or sultaine. The zwitterionic surfactant can include dihydroxyl alkyl glycinate, alkyl ampho acetate or propionate, alkyl amidoamine oxide, gemini VES, alkyl betaine, alkyl amidopropyl betaine, and alkylimino mono- or di-propionates derived from waxes, fats, or oils. FIGS. 5A-5C are example chemical structures of zwitterionic surfactants for a VES for a reactive treatment fluid: disodium tallow-iminodipropionate (FIG. 5A), disodium oleamidopropyl betaine (FIG. 5B), and erucylamidopropyl betaine (FIG. 5C). In FIG. 5A, R=tallow.

For cationic surfactants, examples include, but are not limited to, alkylammonium salts. FIGS. 6A-6C are example chemical structures of such salts: oleyl methyl bis(2-hydroxyethyl) ammonium chloride (FIG. 6A), erucyl bis(2-hydroxyethyl)methylammonium chloride (FIG. 6B), and N,N,N, trimethyl-1-octadecammonium chloride (FIG. 6C). Other alkylammonium salts as the cationic surfactant can include cetyltrimethylammonium bromide (CTAB) or dim-ethylene-1,2-bis(dodecyldimethylammonium bromide). The cationic surfactant can be associated with inorganic anions, such as sulfate, nitrate, and halide. The cationic surfactant can be associated with organic anions, such as salicylate, functionalized sulfonates, chlorobenzoates, phenates, picolinates, and acetates. The cationic surfactant can alternatively be associated with an oxidizing anion, such as chlorate, bromate, perchlorate, chlorite, hypochlorite, persulfate, iodate, bromite, hypobromite, perborate, dichromate, per-manganate, ferrate, percarbonate, nitrite, and nitrate.

Examples of anionic surfactants include alkyl sarcosi-nates or sulfonates. FIGS. 7A-7C are example chemical structures of anionic surfactants. FIG. 7A illustrates oleoyl sarcosine as an example of an alkyl sarcosinate. In some implementations, the oleoyl sarcosine constitutes 90-95% of the sarcosinate product, e.g., approximately 94%. FIGS. 7B and 7C illustrate methyl ester sulfonate and sodium xylene sulfonate, respectively, as examples of sulfonates. In FIG. 7B, R is an alkyl chain with 10-30 carbon atoms.

Examples of nonionic surfactants include amine oxides. FIGS. 8A and 8B illustrates tallow amido propylamide oxide (TAPAO) and three major components of the tallow amido substituent, respectively.

In one implementation, the VES components for the reactive treatment fluid can include a combination of cat-ionic and anionic surfactants, e.g., N,N,N-trimethyl-1-octa-decammonium chloride and sodium xylene sulfonate, where the total surfactant concentration ranges from 0.1 wt. % to 10 wt. %, e.g., from 0.5 wt. % to 7 wt. %. For example, the total surfactant concentration can be from 1 wt. % to 7 wt. %, from 1 wt. % to 5 wt. %, or from 3 wt. % to 5 wt. %.

Oxidizing Salt for Reactive Treatment Fluid

In various implementations, the reactive treatment fluid contains a reactive breaker such as an oxidizing salt. The reactive breaker can break polymeric materials in the filter cake. The concentration of the oxidizing salt in the reactive treatment fluid can be at least 1 wt. % (e.g., at least 5 wt. % or at least 10 wt. %) and/or at most 22 wt. % (e.g., at most 15 wt. % or at most 10 wt. %) of the reactive treatment fluid. In some implementations, the concentration of the oxidizing salt is from 1 wt. % to 22 wt. % or from 1 wt. % to 10 wt. %. In some implementations, the reactive breaker even at high concentration, e.g., saturated in the reactive treatment fluid, does not affect the gelling performance of the VES, but may break polymer upon exposure. By utilizing a gel, some of the oxidizing salt in the reactive treatment fluid can extend across the horizontal section of the wellbore. The oxidizing salt as the breaker may be at or below saturated conditions in the reactive treatment fluid. The oxidizing salt can exceed saturation. The concentration of the oxidizing salt can be in excess of that to break the polymer. The concentration of the oxidizing salt in the reactive treatment fluid may be specified based on the thickness of the filter cake and the particular well or section of the wellbore.

In various implementations, the reactive breaker can attack and degrade organic materials in the geological formation. The oxidizing salts are generally inert to oxidation. Examples of the oxidizing salt include lithium chlorate (LiClO$_3$), sodium chlorate (NaClO$_3$), potassium chlorate (KclO$_3$), magnesium chlorate [Mg(ClO$_3$)$_2$], calcium chlorate [Ca(ClO$_3$)$_2$], strontium chlorate [Sr(ClO$_3$)$_2$], barium chlorate [Ba(ClO$_3$)$_2$], lithium bromate (LiBro$_3$), sodium bromate (NaBrO$_3$), potassium bromate (KbrO$_3$), magnesium bromate [Mg(BrO$_3$)$_2$], calcium bromate [Ca(BrO$_3$)$_2$], strontium bromate [Sr(BrO$_3$)$_2$], and barium bromate [Ba(BrO$_3$)$_2$]. Other oxidizers that can be used include magnesium peroxide, calcium peroxide, sodium nitrate, sodium nitrite, sodium persulfate, potassium persulfate, sodium tetraborate, sodium percarbonate, sodium hypochlorite, an iodate salt, a periodate salt, a dichromate salt, a chlorite salt, a hypochlo-rite salt, and a permanganate salt. The iodate salt may be a salt with lithium, sodium, potassium, or magnesium, among others. Hydrogen peroxide as an oxidizer can also be used.

In addition to provide the ability to degrade the polymeric materials and others in the filter cake, the inorganic oxidizer salts promote formation of micelles, such as cylindrical or worm-like micelles, to increase viscosity of the reactive treatment fluid.

Acid-Generating Material for Reactive Treatment Fluid

In addition, in some implementations, the reactive treat-ment fluid further contains an acid-generating material that is neutral during mixing on the Earth surface and initial pumping into the wellbore. The generated acid can dissolve the inorganic salt in the filter cake. In some implementations, heat can be used as a trigger for acid generation. For example, once the reactive treatment fluid increases in temperature in the wellbore due to heat provided by the subterranean formation, acid may be generated by the acid-generating material. Other triggers may also cause the reaction to occur that results in acid formation such as pH change. The acid may lower the viscosity of the gel. The acid may dissolve some weighting materials, e.g., calcium car-bonate, of the filter cake.

Multiple techniques can be employed to generate acid in situ. A wide range of acids can be produced depending on the technique. In some implementations, an acid generated is hydrochloric acid. The generation of the acid can thus involve liberation of hydrogen ions or hydrogen chloride.

A first technique for acid generation is the use of degrad-able polymeric materials. The solid acid-generating material can degrade over time, e.g., due to formation temperature, to generate acid. Examples of degradable polymeric materials include polylactic acid (PLA), also known as polylactide, polyglycolic acid (PGA), an orthoester, or a polyanhydride, or any combinations thereof.

The size of the particles can be, for example, in ranges of from 20 microns (μm) to 2 mm, from 100 microns to 1 mm, from 100 microns to 500 microns, from 125 microns to 400 microns, or from 150 microns to 200 microns. In some implementations, the particular solid acid-generating mate-rial is selected at least in part on the formation temperature or well temperature. For instance, in some implementations, PLA is used for wells have higher temperature, e.g., at least 200° F. (93.3° C.) or in a range of 200° F. (93.3° C.) to 350° F. (176.7° C.). In another example, PGA may be utilized for wells with lower temperature, such as less than 200° F. (93.3° C.) or in a range of 140° F. (60° C.) to 200° F. (93.3° C.).

A second technique to generate acid in situ is to incorporate an ester as the acid-generating material into the reactive treatment fluid. As the reactive treatment fluid is applied to the wellbore, the esters may hydrolyze over time to generate acid including due to temperature of the subterranean formation or wellbore. The esters can be, for example, of carboxylic acid. Fast degrading esters can be utilized for wellbores in subterranean formations having lower temperatures such as less than 200° F. (93.3° C.) or in a range of 140° F. (60° C.) to 200° F. (93.3° C.). In contrast, slow hydrolyzing esters may be utilized for wellbores in subterranean formations having higher temperatures, e.g., at least 200° F. (93.3° C.).

A third technique to generate acid in situ is to use ammonium salt as the acid-generating material to the reactive treatment fluid, where an acid is formed by the oxidation of the ammonium salt. In various implementations, the oxidation can be induced by an oxidizing salt present in the reactive treatment fluid. In some implementations, the oxidizing salt is the same oxidizing salt as the reactive breaker as described above. If so, the oxidizing salt in this acid generation can be excess oxidizing salt from the polymer breaking. This oxidizing salt may also be in excess to that needed to react with the ammonium for acid generation. In other implementations, the oxidizing salt can be different than the oxidizing salt that is the reactive breaker. The oxidizing salt may be a second oxidizing salt in addition to the oxidizing salt as the reactive breaker that breaks the polymer in the filter cake.

The type of acid that can be generated can depend on the anion of the ammonium salt. For example, citric acid can be generated from the oxidation of ammonium citrate, sulfonic acid from sulfonate, and sulfuric acid from sulfate. The length of an induction time prior to acid being generated can be controlled by the counter anion with the ammonium salt or by addition of nonoxidizing salts. In some implementations, addition of lithium-based salts delays the formation of acid. In some implementations, addition of bromide-based salts delays the formation of acid.

Examples of the ammonium salt include ammonium halide, e.g., ammonium fluoride, ammonium chloride, ammonium bromide, ammonium iodide, and mixtures thereof. In some implementations, the ammonium salt can include an anion that is also an oxidizing agent. For instance, the ammonium salt can include ammonium persulfate. Further, the ammonium salt can include a polyatomic anion such as sulfate, hydrogen sulfate, thiosulfate, nitrite, nitrate, phosphite, phosphate, monohydrogen phosphate, dihydrogen phosphate, carbonate, and combinations thereof.

In some implementations, the ammonium salt includes an N-substituted ammonium salt, e.g., mono-substituted, di-substituted with one or two alkyl groups, or tri-substituted with three alkyl groups. Examples of the alkyl groups include methyl, ethyl, propyl, and butyl. In some implementation, the ammonium salt is not a tri-substituted ammonium salt or a tetra-substituted ammonium salt.

Other examples of the ammonium salt include ammonium alkylsulfonates, ammonium arylsulfonates, ammonium alkarylsulfonates, or any combinations thereof. Further, the ammonium salt can include substituted, unsubstituted ammonium alkylsulfonates, ammonium arylsulfonates, or combinations thereof. In various implementations, an alkyl group of an alkylsulfonate anion is substituted with one or more of halogen, —OR, and —SR, wherein R is hydrogen or a $C_{1-6}$ alkyl. In some implementations, the ammonium salt is selected from ammonium methanesulfonate, ammonium ethanesulfonate, ammonium propanesulfonate, ammonium butanesulfonate, ammonium trifluoromethanesulfonate, ammonium perfluorobutanesulfonate, ammonium chlorobenzenesulfonate, ammonium p-iodobenzenesulfonate, ammonium benzenesulfonate, ammonium p-toluenesulfonate, ammonium camphorsulfonate, and combinations thereof. Tn ammonium salt can also be selected from ammonium methanesulfonate, ammonium trifluoromethanesulfonate, and ammonium perfluorobutanesulfonate. The ammonium salt can also include anions of formate, citrate, oxalate, ascorbate, acetate, trifluoroacetate, or other carboxylates.

In some implementations, the amount or concentration of acid-generating material, e.g., degradable polymeric materials, esters, or ammonium salts, to specify to include in the reactive treatment fluid is correlative with the amount or concentration of the target component, e.g., inorganic salts, in the filter cake.

Inverting Surfactant for Reactive Treatment Fluid

In various implementations, the reactive treatment fluid can further include an inverting surfactant encapsulated in a degradable material. This addition can be particularly useful in addressing the difficulty of removing the oil-based filter cake. In some implementations, the degradable material encapsulating the inverting surfactant degrades at the wellbore temperature and releases the inverting surfactant. Subsequently, the inverting surfactant can invert the oil-based filter cake to enhance its miscibility or solubility in the aqueous phase of the fluid, thereby promoting the breakage of the filter cake. In some implementations, the inverting surfactant has a hydrophile-lipophile balance (HLB) of at least 12.

Other Additives for Reactive Treatment Fluid

The reactive treatment fluid can further include a pH control agent. In various implementations, a base is added to the reactive treatment fluid to increase the pH. The base can include, for example, potassium hydroxide (KOH) or sodium hydroxide (NaOH). In some implementations, the pH of reactive treatment fluid can be adjusted to from 6 to 12 (e.g., from 7 to 12, from 8 to 12, from 9 to 12, from 10 to 12, from 11 to 12, from 6 to 11, from 6 to 10, from 6 to 9, from 6 to 8, or from 6 to 7). In some implementations, the pH control agent is at least 0.2 wt. % (e.g., at least 0.5 wt. % or at least 1 wt. %) and/or at most 5 wt. % (e.g., at most 3 wt. % or at most 1 wt. %) of the reactive treatment fluid. In some implementations, the pH control agent is from 0.2 wt. % to 5 wt. % of the reactive treatment fluid (e.g., from 0.5 wt. % to 5 wt. %, from 1 wt. % to 5 wt. %, from 2 wt. % to 5 wt. %, from 3 wt. % to 5 wt. %, from 4 wt. % to 5 wt. %, from 0.2 wt. % to 3 wt. %, from 0.2 wt. % to 1 wt. %. Or from 0.2 wt. % to 0.5 wt. %).

The inorganic oxidizer salt, e.g., as the reactive breaker, and the monovalent or divalent salts from the base fluid can be both effective in micelle formation. Therefore, in some implementations, the combined concentration of the inorganic oxidizer salt and the monovalent or divalent salt in the fluid can be controlled to provide the optimal fluid performance. In some implementations, the combined concentration is at least 1 wt. % (e.g., at least 3 wt. %, at least 5 wt. %, at least 7 wt. %, at least 10 wt. %, or at least 12 wt. %, or at least 15 wt. %).

Further, the reactive treatment fluid can contain other organic compounds, such as phthalic acid, salicylic acid, or their salts. The salicylate or other ion in the presence of the surfactant may cause the viscoelastic gel to form. In some implementations, the acid (nonionic) form of these compounds causes the viscoelasticity development to be delayed until the pH is altered, e.g., raised, and the anion is released. For example, the pH may be raised by adding urea that is hydrolyzed as the solution starts to heat after pumping into the wellbore and formation. This is a way of imparting some control over when the viscoelasticity develops. In some cases, carboxylic acid and the hydroxyl (OH) group in salicylic acid interacts with the quaternary ammonium group of the VES and acts as a crosslinker to link and make the micelles more robust. This aids formation of stable micelles and thus stable viscosity at formation temperatures.

In some implementations, the reactive treatment fluid further contains nanoparticles, e.g., silica, zirconium, or titanium nanoparticles, which can crosslink the micelles and improve the viscosity. Further, other additives can include organophilic clays and nanoclays that impart favorable electrostatic interactions, e.g., hydrogen bonding, and provide high viscosity for diversion and/or reduce total volume of the fluid needed in the formation to maintain sufficient viscosity. Other examples of possible additives for the reactive treatment fluid include buffer, scale inhibitor, biocide, and corrosion inhibitor such as Cronox™ 242, PAEI-100, Basocorr™ PP, or Basocorr™ PM. In some implementations, the corrosion inhibitor can include methanol or propargyl alcohol as a primary component. In one implementation, the corrosion inhibitor includes 50-60% methanol, 10-20% fatty acids, 10-20% polyoxyalkylenes, 5-10% propargyl alcohol, and olefin.

In various implementations, the reactive treatment fluid has a viscosity suitable for filter cake removal applications. For example, at a temperature from 20° C. to 22° C., the viscosity of the reactive treatment fluid can be at most 40 cP (mPa·s) (e.g., at most 30 cP (mPa·s), at most 20 cP (mPa·s), or at most 10 cP (mPa·s)). In some implementations, at this temperature, the viscosity is from 5 cP (mPa·s) to 40 cP (mPa·s) at a temperature from 20° C. to 22° C. (e.g., from 5 cP (mPa·s) to 30 cP (mPa·s), from 5 cP (mPa·s) to 20 cP (mPa·s), or from 5 cP (mPa·s) to 10 cP (mPa·s)).

In various implementations, in the subterranean formation with an elevated temperature, the reactive treatment fluid exhibits a fluid property suitable for filter cake removal. In some implementations, the viscosity of reactive treatment fluid at a temperature from 200° F. (93.3° C.) to 300° F. (148.9° C.) is at least 50 cP (mPa·s) (e.g., at least 60 cP (mPa·s) or at least 70 cP (mPa·s)) and/or at most 300 cP (mPa·s) (e.g., at most 200 cP (mPa·s), at most 150 cP (mPa·s), or at most 100 cP (mPa·s)). In some implementations, at this temperature, the viscosity of reactive treatment fluid is from 50 cP (mPa·s) to 300 cP (mPa·s) (e.g., from 50 cP (mPa·s) to 200 cP (mPa·s), from 50 cP (mPa·s) to 150 cP (mPa·s), from 50 cP (mPa·s) to 100 cP (mPa·s), from 60 cP (mPa·s) to 100 cP (mPa·s), from 70 cP (mPa·s) to 100 cP (mPa·s), from 80 cP (mPa·s) to 100 cP (mPa·s)).

Filter Cake Removal with the Reactive Treatment Fluid

In various implementations, the process of filter cake removal includes injecting the reactive treatment fluid into the wellbore that contains the filter cake. In some implementations, the filter cake removal can further include injecting another treatment fluid simultaneously or separately. In other words, the reactive treatment fluid can be pumped alone or in tandem with other fluids.

The reactive treatment fluid can be used to for a water-based filter cake or an oil-based filter cake. The composition of the reactive treatment fluid can be modified according to the nature of the filter cake and its composition.

In some implementations, the reactive treatment fluid is pumped as part of a series of steps for treating the oil-based filter cake. For example, prior to pumping the reactive treatment fluid, a pretreatment fluid can be pumped to change the wettability of the filter cake from oil-wet to water-wet. In some implementations, the pretreatment fluid contains an inverting surfactant encapsulated in a degradable material. The inverting surfactant can have a HLB of 12 and higher.

Further, the filter cake removal process can include alternately pumping two or more types of treatment fluids into the wellbore, where one of the fluids is the reactive treatment fluid. In some implementations, carbon dioxide ($CO_2$) or a fluid containing $CO_2$ can be used as a second fluid. The second fluid can, for example, include only $CO_2$ or a mixture of $CO_2$ and oxidizers. In some implementations, the injection of $CO_2$ can enhance the cleanup of residues from the filter cake. The second fluid can also contain reactive gases. Examples of the reactive gases include chlorine dioxide ($ClO_2$), chlorine gas ($Cl_2$), bromine gas ($Br_2$), fluorine gas ($F_2$), chlorine monofluoride (CIF), oxygen gas ($O_2$), ozone ($O_3$), nitrous oxide ($N_2O$), nitric oxide (NO), or nitrogen dioxide ($NO_2$) In some implementations, the second fluid is capable of forming foams in the wellbore, reacting to generate halogens, or both.

FIG. 9 is an example process flow diagrams of processes of filter cake removal in accordance with an implementation. A process 900 starts with a step 902 of injecting a reactive treatment fluid into a wellbore in a subterranean formation including a filter cake on a wall of the wellbore, where the filter cake includes a barite, and the reactive treatment fluid includes a base fluid, a chelating agent, a carbonate, an oxidizing salt, an organic acid, a VES, and a base. Subsequently, a step 904 is performed to contact the reactive treatment fluid with the filter cake in the wellbore, where the reactive treatment fluid dissolves or exfoliates the barite from the wall into the reactive treatment fluid, followed by a step 906 of recovering the reactive treatment fluid including the barite removed from the wall.

EXAMPLES

An example composition of the reactive treatment fluid in accordance with one implementation is summarized in Table 1.

TABLE 1

| Chemical composition of a reactive treatment fluid for filter cake removal | | |
| --- | --- | --- |
| Component | Concentration | Function |
| DTPA | 5-30 wt. % | Chelating agent |
| Oxalic acid | 1-15 wt. % | Chelation activator |
| Erucylamidopropyl betaine (Armovis ® EHS) | 4-10 vol. % | Viscoelastic surfactant (VES) |
| Potassium carbonate | 5-30 wt. % | Sulfate converter |
| Potassium hydroxide | 0.2-5 wt. % | pH control agent |
| Sodium bromate | 1-22 wt % | Oxidizing salt |
| Brine | 50-70 wt. % | Base fluid |
| Polylactic acid particles | 10 wt. % | Delayed acid |

In accordance with an implementation, two sets of example reactive treatment fluids were prepared and their rheological characteristics and filter cake removal performance were investigated.

The first set of the reactive treatment fluids were prepared as follows: Ammonium chloride ($NH_4Cl$) (13.5 g in 75 mL water) was prepared at a density of 9.5 ppg, $NaBrO_3$ (21.9 g in 78.1 mL water) was prepared at a density of 10.1 ppg, $CaBr_2$ (335.9 g in 744 mL water) was prepared at a density of 14.2 ppg, and 15.1 ppg $CaCl_2$/$CaBr_2$ mixture was prepared by combining 106.1 g $CaCl_2$) with 889.1 of 14.2 ppg $CaBr_2$ solution. These prepared solutions and erucylamidopropyl betaine (Armovis® EHS surfactant) were mixed at different quantities to prepare a series of reactive treatment fluid samples A-D. The chemical compositions of these samples are shown in Table 2. All samples were prepared to have the density between 12.8 ppg (1.53 kg/L) to 13.1 ppg (1.57 kg/L) with the oxidizing salt concentration from 2.4 wt. % to 4.8 wt. %.

TABLE 2

Chemical composition of reactive treatment fluid and filter cake removal performance

| | | Treatment fluid samples | | | |
| | Units | A | B | C | D |
|---|---|---|---|---|---|
| Brine containing $CaCl_2$/$CaBr_2$ (15.1 ppg) | mL | 65 | 70 | 65 | 67 |
| Erucylamidopropyl betaine (Armovis ® EHS) | mL | 3 | 6 | 3 | 5 |
| Sodium bromate (10.1 ppg) | mL | 20 | 14 | 24 | 28 |
| Ammonium chloride (9.5 ppg) | mL | 12 | 10 | 8 | 0 |
| Density | ppg | 12.89 | 13.08 | 12.92 | 13.06 |
| Filter Cake Mass Change | % | 20.5 | -13.5 | 34.6 | -33.6 |

Figure 10:
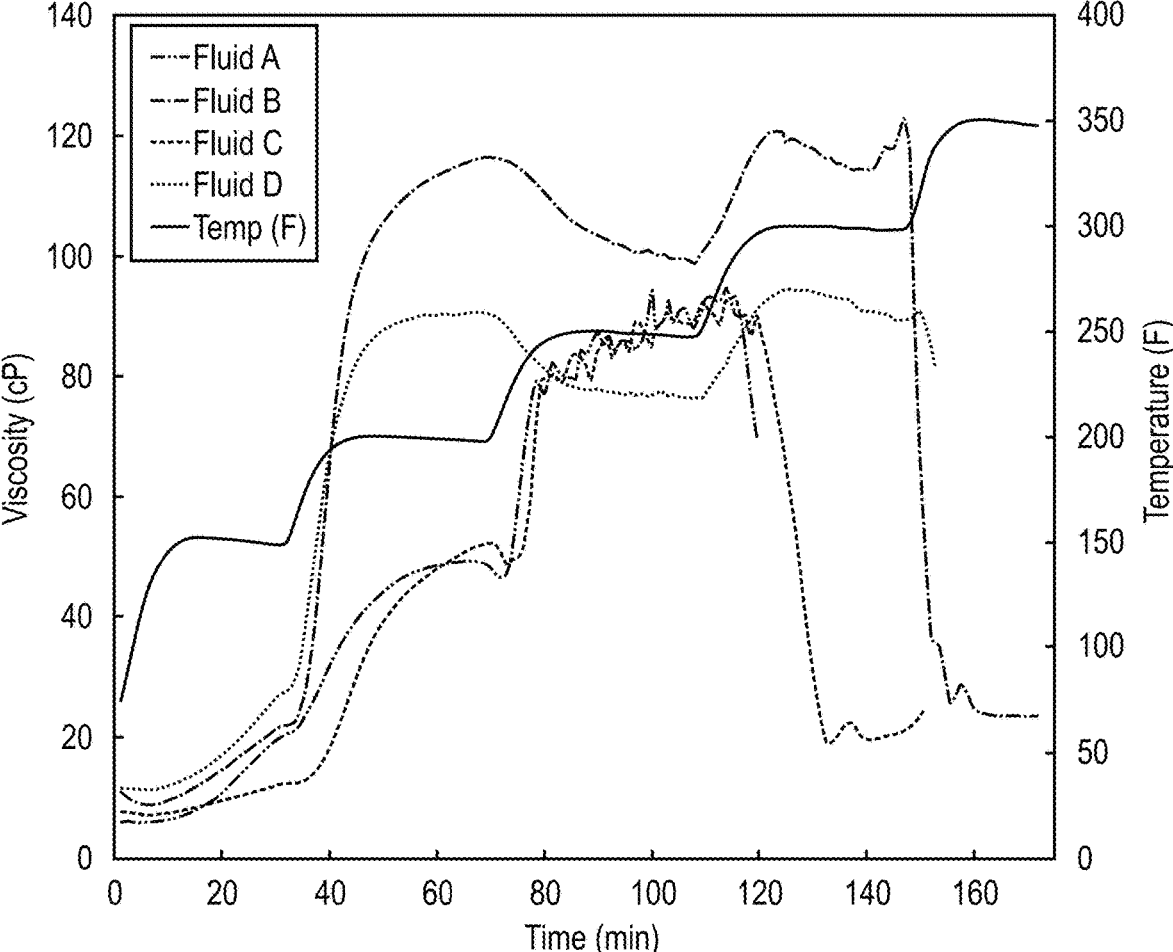
FIG. 10 is a plot of rheological profiles for a reactive treatment fluid as a function of temperature.

The viscosity of the fluid samples A-D were measured by a Grace M5600 viscometer with R1B5 bob at 100 sec$^{-1}$. The temperature sweeps were done by heating to a set temperature and holding at that temperature for 20 min before increasing the temperature to a next set point. The temperature was initially ramped to 150° F. (65.6° C.) and held until the viscosity was stabilized. The temperature was then ramped by 50° F. (27.8° C.) to the maximum temperature of 350° F. (176.7° C.). The measured viscosity profile at different temperatures is shown in FIG. 10.

For all samples, the viscosity was within a range from 70 cP (mPa·s) to 100 cP (mPa·s) at 250° F. (121.1° C.). This is comparatively lower than expected viscosity of about 300-400 cP (mPa·s) of a similar fluid without using a brine. This lowered viscosity can potentially benefit the overall filter cake removal. At the same time, maintaining this level of viscosity at an elevated temperature can help providing a desired rheological characteristic of the reactive treatment fluid under filter cake removal process conditions.

The first set of the reactive treatment fluid samples A-D was then used for filter cake dissolution tests. To prepare the filter cake for the experiments, OBDF was first prepared with the following components: 54 vol. % diesel, 10-14 parts per billion (ppb) emulsifier (polyaminated fatty acids), 4-6 ppb calcium hydroxide ($Ca(OH)_2$), 3-6 ppb filtration control agent (BDF-513), 0.5 ppb viscosifier (modified fatty acid), 2-4 ppb organophilic clay, 2-6 ppb 1-5% quartz and other silicates, 17 vol. % water, 10 ppb $CaCl_2$), 10 ppb 25 μm calcium carbonate ($CaCO_3$), 10 ppb 50 μm $CaCO_3$, 5 ppb 50 μm graphite, 5 ppb 100 μm graphite, 255 ppb barite ($BaSO_4$). A 50 mL of the OBDF was placed in the cell of an OFI Testing Equipment, Inc. filter press. A ceramic filter disc was added, and the cell was sealed and placed in the filter press. After heating to 250° F. (121.1° C.) at 500 psi for 3 hours, the back pressure was released, and fluid was allowed to pass through the filter producing a solid cake composed of the slurry components. The filter cake was divided into sections of about 2 g each and used for the dissolution tests.

The dissolution tests were performed by combining about 2 g of the prepared oil-based filter cake with 20 mL of a reactive treatment fluid in a glass pressure tube. The mixtures were heated 250° F. (121.1° C.) for 6 hours. The remaining solids were collected and weighted to determine the weight change from the initial amount of the filter cake. The results are shown in Table 2. Among the four samples, fluid samples B and D were effective in filter cake removal with 13.5% and 33.6% mass reduction, respectively. On the other hand, fluid samples A and C resulted in increased mass of the solid. The results suggest that the effective filter cake removal using this reactive treatment fluid may involve having a sufficient level of the VES concentration.

Based on the results of the first set, a second set of reactive treatment fluids was prepared to have the same level of VES concentration that was shown sufficient for the filter cake removal and a varying degree of other parameters such as oxidizing salt (e.g., sodium bromate) and acid-generating material (e.g., ammonium chloride). The second set of reactive treatment fluids were prepared using the same set of the prepared solutions of 9.5 ppg $NH_4Cl$, 10.1 ppg $NaBrO_3$, and 15.1 ppg $CaCl_2$)/$CaBr_2$ mixture as the first set described above. These prepared solutions and erucylamidopropyl betaine (Armovis® EHS surfactant) were mixed at different quantities to prepare a series of reactive treatment fluid samples E-H. The chemical compositions of these samples are shown in Table 3. All samples were prepared to have the density between 12.8 ppg (1.53 kg/L) to 13.0 ppg (1.56 kg/L).

The dissolution tests were performed following the same procedure described above for the first set of reactive treatment fluids. The results are shown in Table 3. All four samples showed approximately 25%-30% mass reduction, demonstrating the ability to remove and at least partially dissolve the oil-based filter cake.

TABLE 3

Chemical composition of reactive treatment fluid for filter cake removal

| | | Reactive reatment fluid samples | | | |
| | Units | E | F | G | H |
|---|---|---|---|---|---|
| Brine containing $CaCl_2$/$CaBr_2$ (15.1 ppg) | mL | 67 | 67 | 67 | 67 |
| Erucylamidopropyl betaine (Armovis ® EHS) | mL | 5 | 6 | 5 | 7 |
| Sodium bromate (10.1 ppg) | mL | 22 | 27 | 18 | 18 |
| Ammonium chloride (9.5 ppg) | mL | 6 | 0 | 10 | 8 |
| Density | ppg | 12.84 | 12.98 | 12.87 | 12.90 |
| Filter Cake Mass Change | % | -30.4 | -25.8 | -29.1 | -28.5 |

Implementations

An implementation described herein provides a fluid comprising: a base fluid; a chelating agent; a carbonate; an oxidizing salt; an organic acid; a viscoelastic surfactant (VES); and a base, where a viscosity of the fluid is 300 cP (mPa·s) or less at a temperature of 300° F. (148.9° C.) or less, and where a density of the fluid from 9 lb/gal (1.08 kg/L) to 20 lb/gal (2.40 kg/L).

In an aspect, combinable with any other aspect, the base fluid includes a brine.

In an aspect, a total dissolved solids (TDS) of the brine is from 50,000 ppm to 250,000 ppm.

In an aspect, combinable with any other aspect, the base fluid includes potassium chloride, sodium chloride, calcium chloride, calcium bromide, potassium formate, or cesium formate.

In an aspect, combinable with any other aspect, the density is from 10 lb/gal (1.20 kg/L) to 16 lb/gal (1.92 kg/L).

In an aspect, combinable with any other aspect, the viscosity is 300 cP (mPa·s) or less at a temperature from 200° F. (93.3° C.) to 300° F. (148.9° C.).

In an aspect, combinable with any other aspect, the viscosity is from 80 cP (mPa·s) to 100 cP (mPa·s) at a temperature from 200° F. (93.3° C.) to 300° F. (148.9° C.).

In an aspect, combinable with any other aspect, the chelating agent includes an aminopolycarboxylic acid or a salt thereof, and where the VES includes erucylamidopropyl betaine.

In an aspect, combinable with any other aspect, the carbonate is potassium carbonate or cesium carbonate, and where the oxidizing salt includes a chlorate or bromate.

In an aspect, combinable with any other aspect, the organic acid includes oxalic acid, formic acid, acetic acid, or lactic acid.

In an aspect, combinable with any other aspect, the base includes potassium hydroxide.

In an aspect, combinable with any other aspect, the fluid further includes an acid-generating material including polylactic acid (PLA), polyglycolic acid (PGA), an orthoester, or a polyanhydride.

In an implementation, a fluid for filter cake removal includes: a brine at a concentration from 50 weight percent (wt. %) to 70 wt. % of the fluid, the brine including calcium chloride or calcium bromide; diethylenetriamine pentaacetic acid (DTPA) at a concentration from 1 wt. % to 15 wt. % of the fluid; a carbonate at a concentration from 5 wt. % to 30 wt. % of the fluid; an oxidizing salt at a concentration from 1 wt. % to 20 wt. % of the fluid; oxalic acid at a concentration from 1 wt. % to 15 wt. % of the fluid; a viscoelastic surfactant (VES); and a base at a concentration from 0.2 wt. % to 5 wt. % of the fluid, where a viscosity of the fluid is 300 cP (mPa·s) or less at a temperature of 300° F. (148.9° C.) or less, and where a density of the fluid from 9 lb/gal (1.08 kg/L) to 20 lb/gal (2.40 kg/L).

In an aspect, combinable with any other aspect, the density is from 12 lb/gal (1.44 kg/L) to 14 lb/gal (1.68 kg/L)).

In an aspect, combinable with any other aspect, the viscosity is from 80 cP (mPa·s) to 100 cP (mPa·s) at a temperature from 200° F. (93.3° C.) to 300° F. (148.9° C.).

In an aspect, combinable with any other aspect, a pH of the fluid is from 9 to 12.

In an implementation, a method of treating a wellbore for filter cake removal includes: injecting a reactive treatment fluid into a wellbore in a subterranean formation including a filter cake on a wall of the wellbore, the filter cake including a barite, the reactive treatment fluid including: a base fluid, a chelating agent, a carbonate, an oxidizing salt, an organic acid, a viscoelastic surfactant (VES), and a base, where the reactive treatment fluid has a density from 9 lb/gal (1.08 kg/L) to 20 lb/gal (2.40 kg/L) and a viscosity of 300 cP (mPa·s) or less at a temperature of 300° F. (148.9° C.) or less; contacting the reactive treatment fluid with the filter cake in the wellbore, the reactive treatment fluid dissolving or exfoliating the barite from the wall into the reactive treatment fluid; and recovering the reactive treatment fluid including the barite removed from the wall.

In an aspect, combinable with any other aspect, the method further includes, prior to injecting the reactive treatment fluid into the wellbore, forming the wellbore by drilling, where the drilling forms the filter cake in the wellbore.

In an aspect, combinable with any other aspect, the method further includes providing carbon dioxide ($CO_2$) into the wellbore.

In an aspect, combinable with any other aspect, the method further includes foaming the reactive treatment fluid with $CO_2$.

While this disclosure has been described with reference to illustrative implementations, this description is not intended to be construed in a limiting sense. Various modifications and combinations of the illustrative implementations, as well as other implementations, will be apparent to persons skilled in the art upon reference to the description. It is therefore intended that the appended claims encompass any such modifications or implementations.

What is claimed is:

1. A fluid comprising:
   a base fluid;
   a chelating agent;
   a carbonate;
   an oxidizing salt;
   oxalic acid at a concentration from 1 wt. % to 15 wt. % of the fluid;
   a viscoelastic surfactant (VES); and
   a base at a concentration from 0.2 wt. % to 5 wt. % of the fluid,
   wherein a viscosity of the fluid is 300 cP (mPa s) or less at a temperature of 300° F. (148.9° C.) or less, and
   wherein a density of the fluid is from 9 lb/gal (1.08 kg/L) to 20 lb/gal (2.40 kg/L).

2. The fluid of claim 1, wherein the base fluid comprises a brine.

3. The fluid of claim 2, wherein a total dissolved solids (TDS) of the brine is from 50,000 ppm to 250,000 ppm.

4. The fluid of claim 1, wherein the base fluid comprises potassium chloride, sodium chloride, calcium chloride, calcium bromide, potassium formate, or cesium formate.

5. The fluid of claim 1, wherein the density is from 10 lb/gal (1.20 kg/L) to 16 lb/gal (1.92 kg/L).

6. The fluid of claim 1, wherein the viscosity is 300 cP (mPa·s) or less at a temperature from 200° F. (93.3° C.) to 300° F. (148.9° C.).

7. The fluid of claim 1, wherein the viscosity is from 80 cP (mPa's) to 100 cP (mPa s) at a temperature from 200° F. (93.3° C.) to 300° F. (148.9° C.).

8. The fluid of claim 1, wherein the chelating agent comprises an aminopolycarboxylic acid or a salt thereof, and wherein the VES comprises erucylamidopropyl betaine.

9. The fluid of claim 1, wherein the carbonate is potassium carbonate or cesium carbonate, and wherein the oxidizing salt comprises a chlorate or bromate.

10. The fluid of claim 1, wherein the base comprises potassium hydroxide.

11. The fluid of claim 1, further comprising an acid-generating material comprising polylactic acid (PLA), polyglycolic acid (PGA), an orthoester, or a polyanhydride.

12. A fluid for filter cake removal, the fluid comprising:
   a brine at a concentration from 50 weight percent (wt. %) to 70 wt. % of the fluid, the brine comprising calcium chloride or calcium bromide;

diethylenetriamine pentaacetic acid (DTPA) at a concentration from 1 wt. % to 15 wt. % of the fluid;

a carbonate at a concentration from 5 wt. % to 30 wt. % of the fluid;

an oxidizing salt at a concentration from 1 wt. % to 20 wt. % of the fluid;

oxalic acid at a concentration from 1 wt. % to 15 wt. % of the fluid;

a viscoelastic surfactant (VES); and a base at a concentration from 0.2 wt. % to 5 wt. % of the fluid, wherein a viscosity of the fluid is 300 cP (mPa s) or less at a temperature of 300° F. (148.9° C.) or less, and wherein a density of the fluid is from 9 lb/gal (1.08 kg/L) to 20 lb/gal (2.40 kg/L).

13. The fluid of claim 12, wherein the density is from 12 lb/gal (1.44 kg/L) to 14 lb/gal (1.68 kg/L)).

14. The fluid of claim 12, wherein the viscosity is from 80 cP (mPa·s) to 100 cP (mPa·s) at a temperature from 200° F. (93.3° C.) to 300° F. (148.9° C.).

15. The fluid of claim 12, wherein a pH of the fluid is from 9 to 12.

16. A method of treating a wellbore for filter cake removal, the method comprising:

injecting a reactive treatment fluid into a wellbore in a subterranean formation comprising a filter cake on a wall of the wellbore, the filter cake comprising a barite, the reactive treatment fluid comprising:

a base fluid, a chelating agent, a carbonate, an oxidizing salt, oxalic acid at a concentration from 1 wt. % to 15 wt. % of the reactive treatment fluid, a viscoelastic surfactant (VES), and a base at a concentration from 0.2 wt. % to 5 wt. % of the reactive treatment fluid, wherein the reactive treatment fluid has a density from 9 lb/gal (1.08 kg/L) to 20 lb/gal (2.40 kg/L) and a viscosity of 300 cP (mPa s) or less at a temperature of 300° F. (148.9° C.) or less;

contacting the reactive treatment fluid with the filter cake in the wellbore, the reactive treatment fluid dissolving or exfoliating the barite from the wall into the reactive treatment fluid; and recovering the reactive treatment fluid comprising the barite removed from the wall.

17. The method of claim 16, further comprising, prior to injecting the reactive treatment fluid into the wellbore, forming the wellbore by drilling, wherein the drilling forms the filter cake in the wellbore.

18. The method of claim 16, further comprising providing carbon dioxide ($CO_2$) into the wellbore.

19. The method of claim 16, further comprising foaming the reactive treatment fluid with $CO_2$.

\* \* \* \* \*